United States Patent
Ogawa

(10) Patent No.: US 11,436,762 B2
(45) Date of Patent: Sep. 6, 2022

(54) IMAGE PROCESSING SYSTEM, IMAGE PROCESSING METHOD, AND IMAGE PROCESSING APPARATUS

(71) Applicant: CANON KABUSHIKI KAISHA, Tokyo (JP)

(72) Inventor: Takuya Ogawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 16/826,660

(22) Filed: Mar. 23, 2020

(65) Prior Publication Data
US 2020/0311982 A1    Oct. 1, 2020

(30) Foreign Application Priority Data
Mar. 27, 2019  (JP) .............................. JP2019-060441

(51) Int. Cl.
*G06T 9/00* (2006.01)
*G06T 5/50* (2006.01)
*G06T 5/00* (2006.01)

(52) U.S. Cl.
CPC .............. *G06T 9/002* (2013.01); *G06T 5/002* (2013.01); *G06T 5/50* (2013.01)

(58) Field of Classification Search
CPC ........... G06T 9/002; G06T 5/002; G06T 5/50; G06T 2207/20081; G06T 2207/20084; G06T 2207/30176; G06T 2210/36; G06T 3/4053; G06T 3/4092; G06T 9/00; H04N 19/86; H04N 1/00241; H04N 1/40; H04N 1/32128; H04N 1/3935; H04N 19/30; H04N 19/44; H04N 2201/3269; H04N 2201/3225; G06K 19/06037; G06K 9/00442; G06K 19/06018; G06K 15/1811; G06N 3/08; G06N 3/082; G06N 3/084; G06N 3/086; G06N 3/088; G06N 3/0445; G06N 3/0454; G06N 3/0472; G06N 20/00; G06F 3/1248; G06F 16/40
See application file for complete search history.

(56) References Cited

U.S. PATENT DOCUMENTS

| | | | |
|---|---|---|---|
| 10,839,564 B2 * | 11/2020 | Gueguen | H04N 19/186 |
| 2005/0134886 A1 * | 6/2005 | Farrell | G06F 3/1248 358/1.13 |
| 2005/0190397 A1 * | 9/2005 | Ferlitsch | G06K 15/00 358/1.15 |
| 2017/0230675 A1 * | 8/2017 | Wierstra | G06N 3/08 |
| 2019/0188535 A1 * | 6/2019 | Chen | G06K 9/6262 |
| 2019/0244362 A1 * | 8/2019 | Movshovitz-Attias | G06T 7/136 |
| 2020/0029084 A1 * | 1/2020 | Wierstra | H04N 19/44 |

FOREIGN PATENT DOCUMENTS

JP    2016-127475 A    7/2016

* cited by examiner

Primary Examiner — Jose L Couso
(74) Attorney, Agent, or Firm — Canon U.S.A., Inc. IP Division

(57) ABSTRACT

In an image processing system according to the present disclosure, image data after conversion is obtained by converting compressed image data by using a neural network, in which the neural network is generated by performing learning based on first image data and second image data obtained by lossy-compressing the first image data.

17 Claims, 22 Drawing Sheets

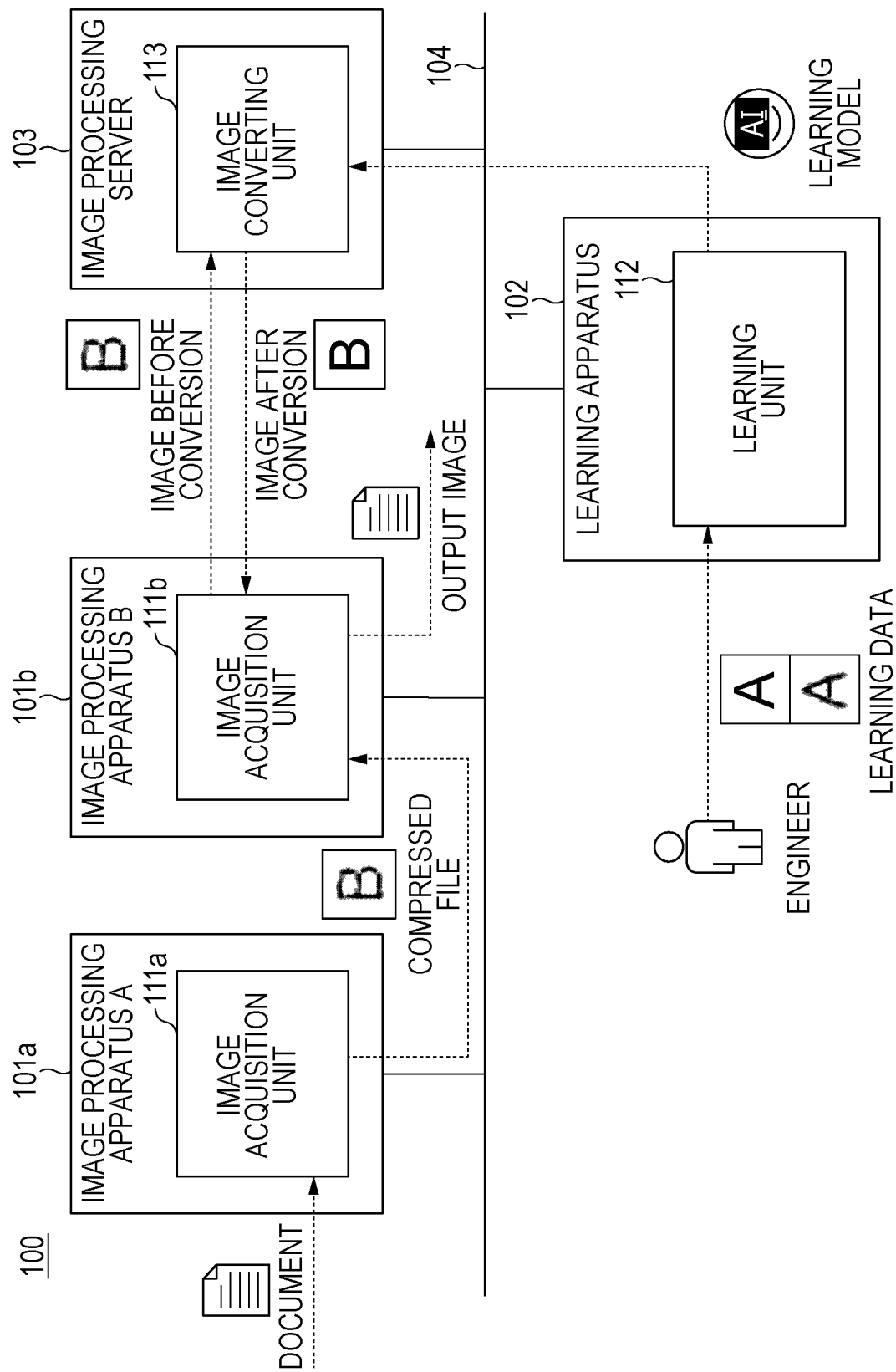

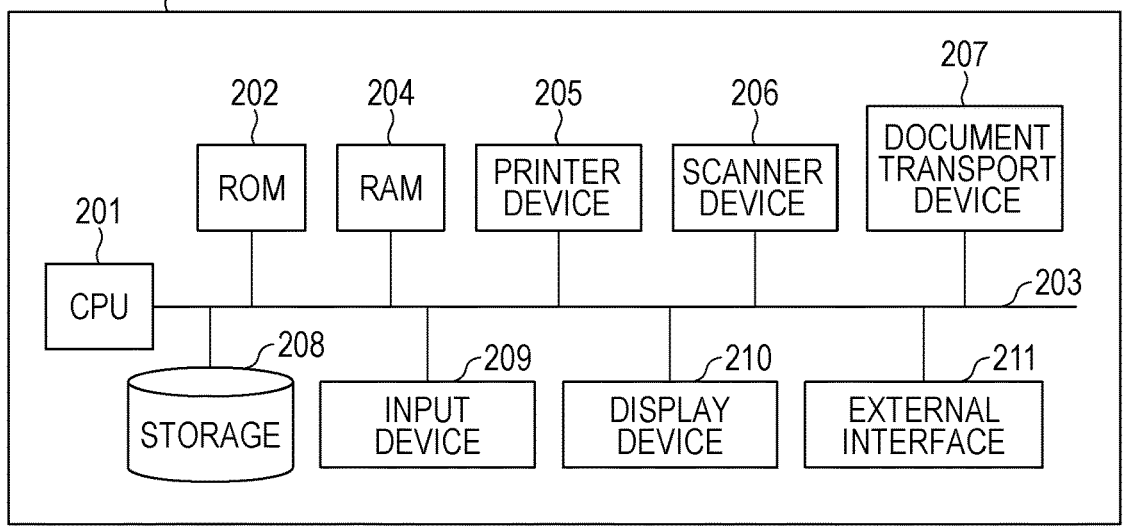
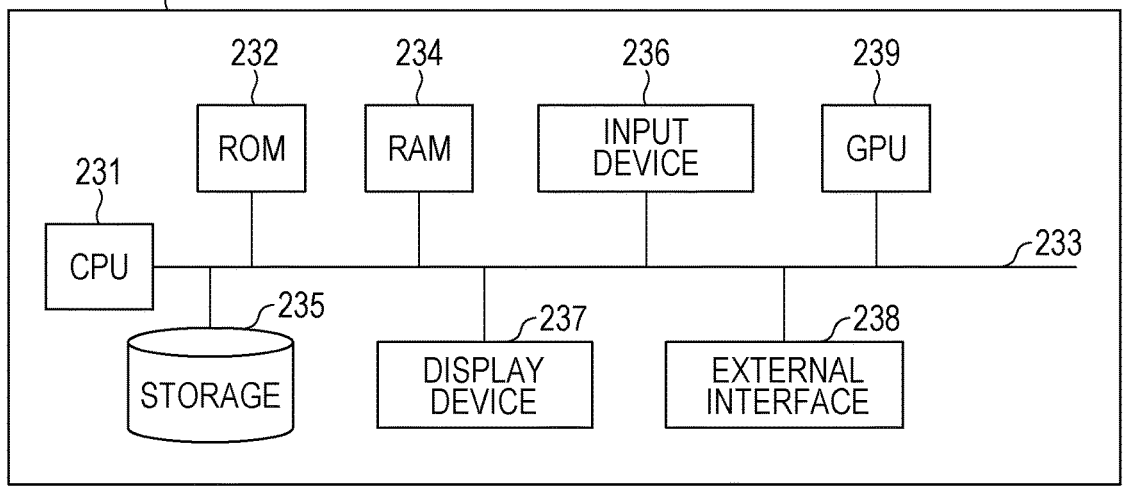
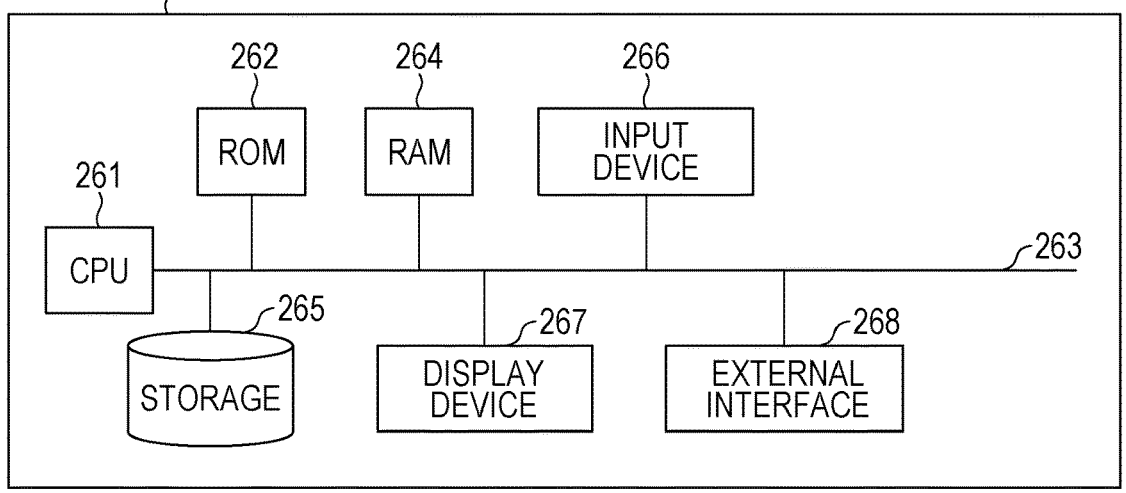

FIG. 12

| COMPRESSION FORMAT \ QUALITY | QUALITY HIGH (100 TO 71) | QUALITY MEDIUM (70 TO 31) | QUALITY LOW (30 TO 1) | QUALITY UNKNOWN |
|---|---|---|---|---|
| JPEG (OUTPUT SOURCE A) | A | E | I | M |
| JPEG (OUTPUT SOURCE B) | B | F | J | M |
| WebP (OUTPUT SOURCE C) | C | G | K | N |
| WebP (OUTPUT SOURCE D) | D | H | L | N |

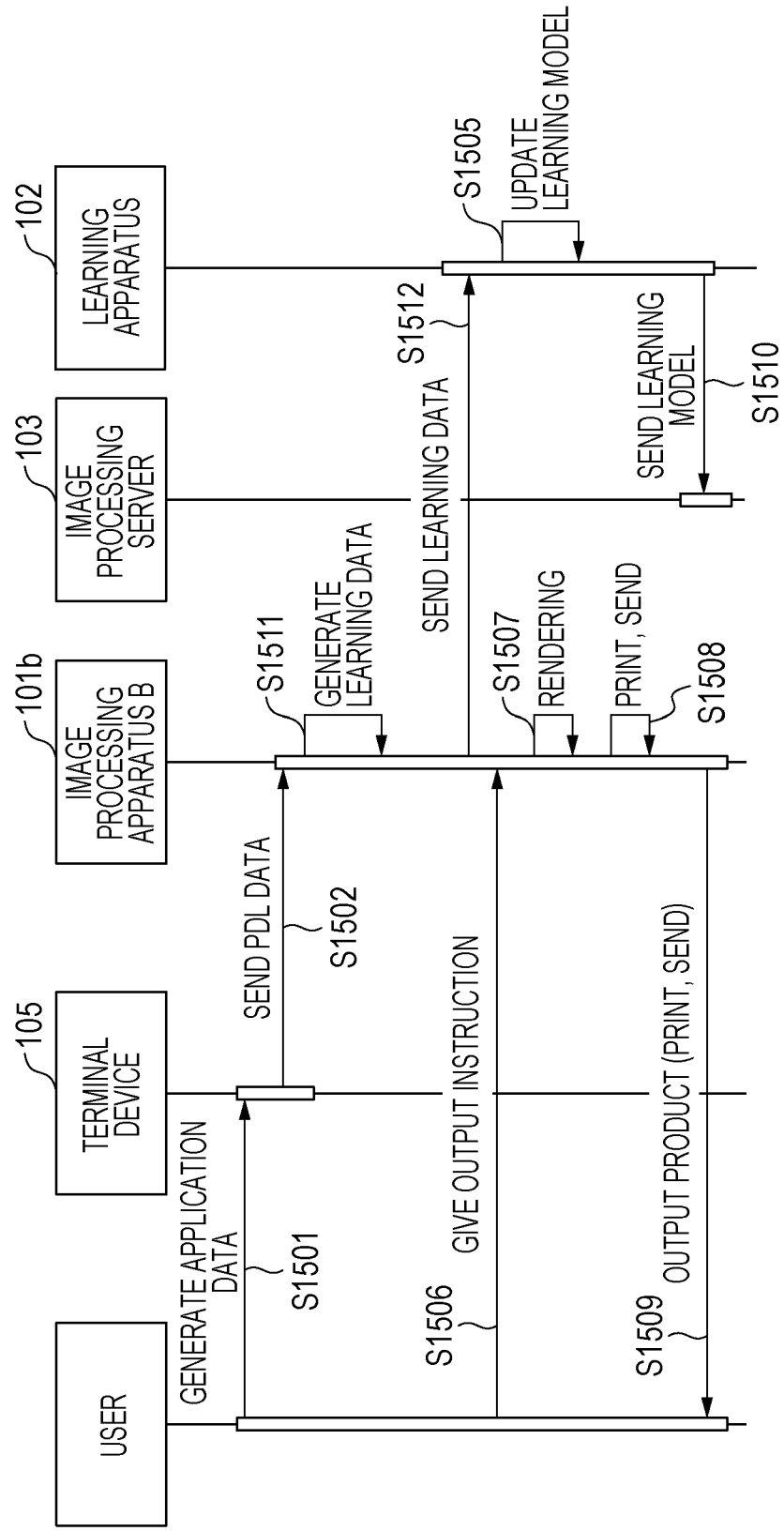

IMAGE PROCESSING SYSTEM, IMAGE PROCESSING METHOD, AND IMAGE PROCESSING APPARATUS

BACKGROUND

Field of the Disclosure

The present disclosure relates to an image processing system converting an image by using a neural network.

Description of the Related Art

Image processing apparatuses such as a multi function peripheral (MFP) having a sending function (called a SEND function or the like) for sending a scanned image are conventionally known. In such apparatuses, data is reduced in amount in order to suppress communication costs (communication time, communication bandwidth) upon sending image data via a network. As a method of reducing the amount of data, a method using lossy compression such as Joint Photographic Experts Group (JPEG) compression is known. Lossy compression can reduce the amount of data without changing the size of an image but causes a reduction in image quality. For example, in the JPEG compression, compression noise such as mosquito noise or block noise occurs with increasing compression rate, and image quality deteriorates. Output based on a low-quality image leads to a decrease in user satisfaction, and it is desirable to improve the low quality of the image and output an obtained high-quality image.

Japanese Patent Laid-Open No. 2016-127475 proposes a technique of improving the low quality of a sent image data and outputting obtained higher quality image data. Specifically, a technique is disclosed to achieve higher resolution by preparing pairs of a low-resolution patch and a high-resolution patch as a dictionary, searching for low-resolution patches similar to a predetermined reference region of low-resolution image data, and combining corresponding high-resolution patches.

In Japanese Patent Laid-Open No. 2016-127475, it is assumed that sets of low-resolution patches and high-resolution patches are stored in advance. Therefore, it has been difficult to improve the quality of an image having an unexpected configuration, that is, an image for which no patch is prepared.

SUMMARY

An image processing system according to the present disclosure includes: at least one memory that stores a program; and at least one processor that executes the program to perform: receiving compressed image data; obtaining image data after conversion by converting the compressed image data by using a neural network, wherein the neural network is generated by performing learning based on first image data and second image data obtained by lossy-compressing the first image data; and outputting the image data after conversion.

Further features of the present disclosure will become apparent from the following description of exemplary embodiments (with reference to the attached drawings).

BRIEF DESCRIPTION OF THE DRAWINGS

FIG. 1 is a diagram illustrating a configuration of an image processing system.

FIG. 2A is a diagram illustrating a configuration of an image processing apparatus. FIG. 2B is a diagram illustrating a configuration of a learning apparatus. FIG. 2C is a diagram illustrating a configuration of an image processing server.

FIG. 12 is a table illustrating types of learning models.

FIG. 15B is a diagram illustrating a learning sequence in a modification of the image processing system.

DESCRIPTION OF THE EMBODIMENTS

Figure 3:
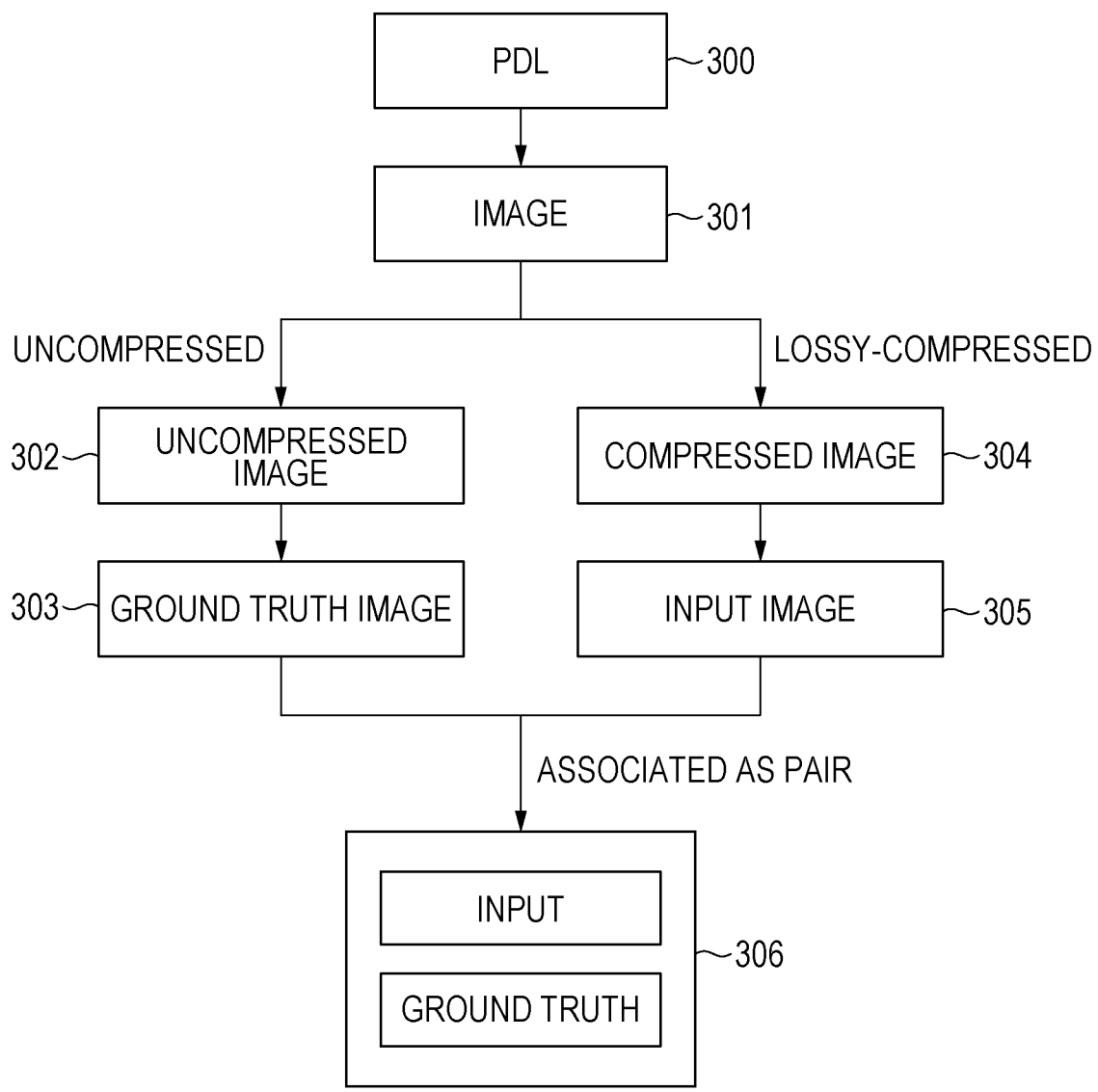
FIG. 3 is a diagram illustrating a structure of learning data.

Hereinafter, embodiments of the present disclosure will be described with reference to the drawings. However, components described in the description are merely examples and are not intended to limit the scope of the present disclosure. As long as an object of the present disclosure can be achieved, components may be replaced, added, or deleted.

First Embodiment

<Image Processing System>

The present embodiment will describe an aspect in which a neural network which has learned in advance is used to convert an image having compression noise into an image from which the compression noise has been removed and output the image after conversion.

FIG. 1 is a diagram illustrating a configuration of an image processing system. As illustrated in FIG. 1, the image processing system 100 includes an image processing apparatus 101, a learning apparatus 102, and an image processing server 103 which are connected to each other via a network 104. Note that a plurality of the image processing apparatuses 101, the learning apparatuses 102, or the image processing servers 103 may be connected to the network 104, instead of a single image processing apparatus 101, learning apparatus 102, and image processing server 103. FIG. 1 illustrates a configuration example in which two of an image processing apparatus 101a and an image processing apparatus 101b are connected to the network 104 as the image processing apparatus 101. The image processing apparatus 101a and the image processing apparatus 101b are configured to communicate with each other via the network 104, and for example, the image processing apparatus 101b receives a compressed file sent from the image processing apparatus 101a. The image processing apparatus 101b performs output (printing/sending/preview) on the basis of the received compressed file. Note that in the following description, for ease of description, the image processing apparatus is referred to as image processing apparatus 101a in a description in terms of the sending side, as image processing apparatus 101b in a description in terms of the receiving side, and as image processing apparatus 101 in a description common to both of the sending and receiving sides.

The image processing apparatus 101 is achieved by an MFP or the like configured to achieve a plurality of functions such as copying, printing, scanning, and faxing and has a function as an image acquisition unit 111 (111a, 111b). The image processing apparatus 101a performs compression processing or the like on a scanned image obtained by scanning a document, generates a compressed file and sends the compressed file to the image processing apparatus 101b via the network 104. Transmission methods at this time includes a method of sending image data as much as the number of scanned pages, and a method of processing scanned images of a plurality of pages into one piece of document data and sending the obtained document data. Whichever method is used to send the data, it is possible to specify whether to compress the data, a compression format of the data, and the like.

The image processing apparatus 101b sends the compressed file received from the image processing apparatus 101a to the image processing server 103 via the network 104.

The learning apparatus 102 learns an image conversion model and functions as a learning unit 112 configured to generate a learning result (neural network parameter etc.). The learning apparatus 102 performs learning by using, for example, learning data (teaching data, image data pair) having a pair of an input image and a ground truth image, the learning image being provided by an engineer, and generates a learning result. The learning apparatus 102 sends the generated learning result to the image processing server 103 via the network 104.

The image processing server 103 functions as an image converting unit 113 configured to performs image conversion on an image before conversion acquired by the image processing apparatus 101. The image processing server 103 uses a learning result generated by the learning apparatus 102 to perform conversion using a neural network on an image before conversion and acquires an image after conversion. An example of a machine learning method using a neural network includes deep learning using a multi-layer neural network. Then, the image processing server 103 sends the image after conversion obtained by the conversion to the image processing apparatus 101 again. The image after conversion received from the image processing server 103 is printed out, sent to a destination desired by the user, and/or stored in a storage unit in the image processing apparatus 101 by the image processing apparatus 101.

The network 104 is achieved by a LAN, a public line (WAN), or the like and functions as a communication unit configured to connect the image processing apparatus 101, the learning apparatus 102, and the image processing server 103 to each other to send/receive data between the apparatuses.

<Use Sequence>

Figure 4A:
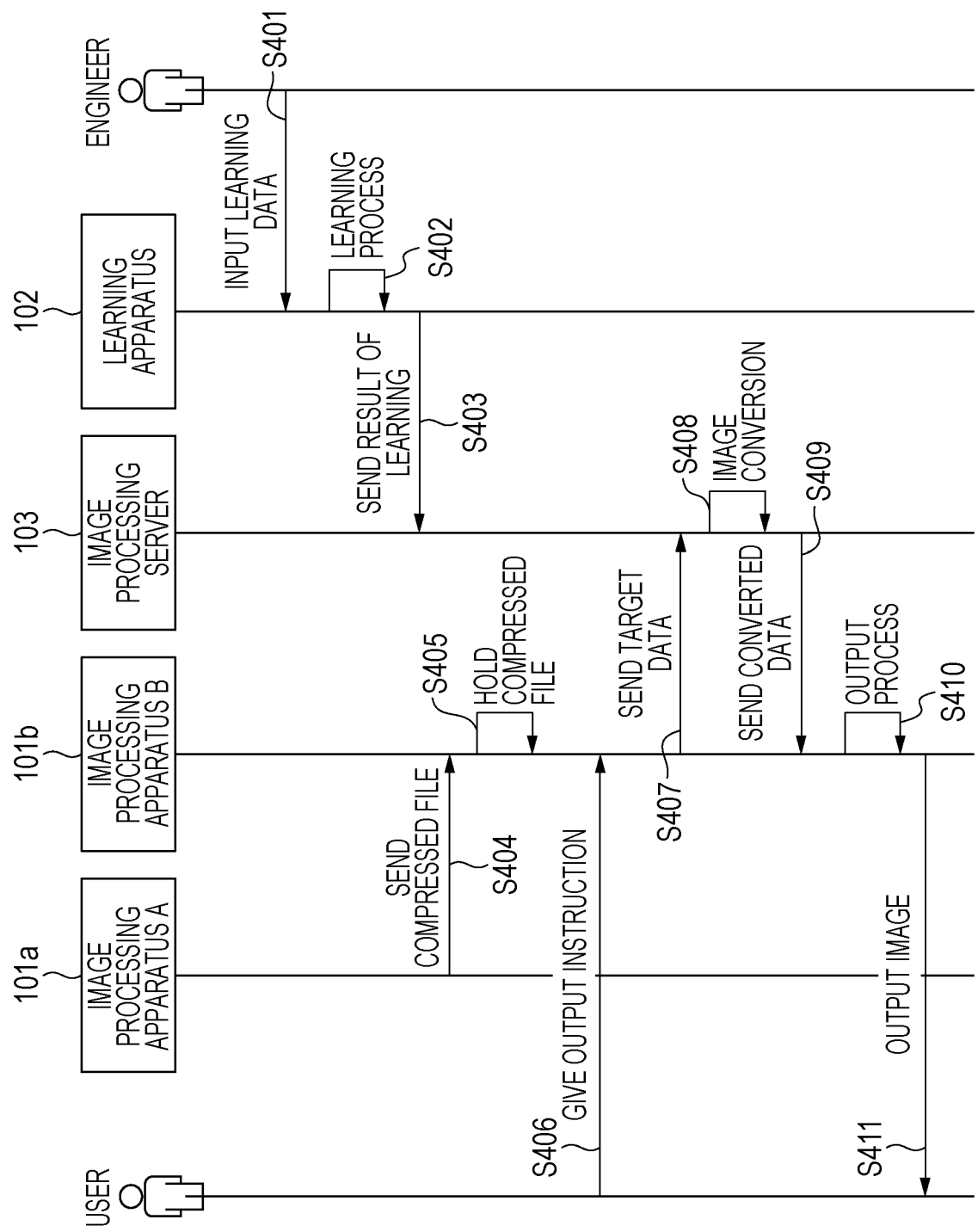
FIG. 4A is a diagram illustrating a use sequence of the image processing system.

FIG. 4A is a diagram illustrating a use sequence of the image processing system. Here, a description will be made of a case in which the user instructs the image processing apparatus 101b to output a received compressed file. In the present embodiment, image conversion on a low-quality image before conversion acquired as a compressed file enables a high-quality image after conversion (image data after conversion) to be provided. Thus, for example, the user can acquire a printed product using a high-quality image and a preview result using a high-quality image. Furthermore, optical character recognition (OCR) performed on the high-quality image after conversion enables extraction of a text contained in the image with high accuracy.

In this use sequence, an engineer of a manufacturer that provides the image processing system 100 inputs learning data to cause the learning apparatus 102 to perform learning for image conversion artificial intelligence (AI) (S401). The learning apparatus 102 uses the input learning data to perform a neural network learning process (S402). If S402 ends, the learning apparatus 102 sends a result of the learning to the image processing server 103 (S403). These steps are steps performed in advance prior to steps described below.

Then, the image processing apparatus 101a sends a compressed file to the image processing apparatus 101b (S404). Upon receiving the compressed file, the image processing apparatus 101b holds the received compressed file (S405). Thereafter, the user gives an instruction to output an image based on the compressed file received by the image processing apparatus 101b to start using the image processing system 100 (S406). The image processing apparatus 101b sends a target file specified by the user to the image processing server 103 (S407). On the basis of the compressed file (compressed image data) received in S407, the image processing server 103 performs image conversion for inputting a low-quality image before conversion and outputting a high-quality image after conversion (S408). The image processing server 103 sends the high-quality image after conversion generated in S408 to the image processing apparatus 101b (S409). The image processing apparatus 101b outputs the received high-quality image after conversion in an output form for which the instruction is given by the user in S406 (S410). For example, if the user instructs the image processing apparatus 101b to print the compressed file in S406, the user obtains a printed sheet on which the high-quality image after conversion is printed by the image processing apparatus 101b in S410 (S411). Note that examples of outputting the image include, in addition to printing, sending the image to a sending destination desired by the user, storage of the image in a storage (network storage), or display (preview) of the image on a screen.

<Equipment Configuration>

In order to achieve the image processing system 100 described above, the image processing apparatus 101, the learning apparatus 102, and the image processing server 103 have the following configurations. FIG. 2A is a diagram illustrating a configuration of the image processing apparatus. As illustrated in FIG. 2A, the image processing apparatus 101 includes the following: a central processing unit (CPU) 201, a ROM 202, a RAM 204, a printer device 205, a scanner device 206, a document transport device 207, a storage 208, an input device 209, a display device 210, and an external interface 211. The devices are communicably connected to each other by a data bus 203.

The CPU 201 is a controller (control unit) configured to integrally control the image processing apparatus 101. The CPU 201 boots an operating system (OS) by a boot program stored in the ROM 202. On this OS, a controller program stored in the storage 208 is executed. The controller program is a program configured to control the image processing apparatus 101. The CPU 201 integrally controls the devices connected by the data bus 203. For example, the CPU 201 executes output control of printing or sending after image conversion is performed on image data received via the network 104. The RAM 204 operates as a temporary storage area such as a main memory or a work area of the CPU 201. The storage 208 includes a readable/writable nonvolatile memory/large-capacity storage area, such as HDD or SSD, and in the storage 208, various data including the above-described controller program are recorded. For example, when an instruction is given to store image data in a box area, the storage 208 is also used as a storage unit for storing image data in the image processing apparatus 101.

The printer device 205 is a device (printing device, image forming unit, image forming device) configured to print image data on paper (recording material, sheet). For the printer device 205, any of an electrophotographic printing method, an ink-jet method, and the like may be employed. The electrophotographic printing method uses a photoreceptor drum, photoconductive belt, or the like, and in the ink-jet method, ink is ejected from a minute nozzle array and an image is directly printed on paper.

The scanner device 206 is a device (image reading device) configured to scan a document such as paper by using an optical reading device such as a charge-coupled device (CCD), obtain electrical signal data, convert the electrical signal data, and generate scanned image data. Furthermore, a document transport device 207 such as an auto document feeder (ADF) transports documents placed on a document feeder at the upper part of the document transport device 207 to the scanner device 206 one by one. The scanner device 206 may have a function for reading a document placed on a glass plate/platen (not illustrated) of the image processing apparatus 101, in addition to the function for reading a document transported by the document transport device 207.

The input device 209 is a device (input device) including a touch panel, hardware keys, and the like. The input device 209 functions as a reception unit receiving a user's operation instruction. Then, instruction information including an instruction position is transmitted to the CPU 201.

The display device 210 is a display unit configured to display display data generated by the CPU 201. As the display device 210, a display device such as LCD or CRT is used. The CPU 201 determines what operation has been performed on the basis of instruction information received from the input device 209 and display data displayed on the display device 210. Then, according to a result of the determination, the image processing apparatus 101 is controlled, and new display data is generated and displayed on the display device 210.

The external interface 211 is an interface configured to transmit and receive various data such as image data to and from an external device via a network such as LAN, telephone line, or proximity wireless communication such as infrared communication. The external interface 211 receives PDL data (data indicating the contents of drawing in a page description language, data in PDL format) from an external device such as the learning apparatus 102 or a PC (not illustrated). The CPU 201 interprets the PDL data received by the external interface 211 and generates an image. The generated image is printed by the printer device 205 or stored in the storage 208. The external interface 211 receives image data from an external device such as the image processing server 103. The received image data is printed by the printer device 205, stored in the storage 208, or sent to another external device by the external interface 211.

The data bus 203 is a communication unit configured to mutually send/receive image data and control information handled inside the controller to/from processing units. Note that each of the above-described devices is connected to the CPU 201 via an I/F (not illustrated). In other words, a communication signal is transmitted between each device and the CPU 201 via the I/F (not illustrated).

Note that image processing performed in the image processing apparatus 101 may be performed not by the CPU 201 but by a dedicated circuit. For example, a RIP may be provided which performs rendering processing on a display list in a vector format generated by interpreting PDL data and then outputs raster image data. Furthermore, an image processing circuit may be provided which performs editing processing such as rotation, scaling, compression, or expansion on image data.

FIG. 2B is a diagram illustrating a configuration of a learning apparatus. As illustrated in FIG. 2B, the learning apparatus 102 includes a CPU 231, a ROM 232, a RAM 234, a storage 235, an input device 236, a display device 237, an external interface 238, and a GPU 239. The devices are configured to transmit/receive data to/from each other via a data bus 233.

The CPU 231 is a controller configured to entirely control the learning apparatus 102. The CPU 231 controls each of the devices via a bus such as the data bus 233. The CPU 231 boots the OS by a boot program stored in the ROM 232 being a nonvolatile memory. On this OS, a learning program stored in the storage 235 is executed. The CPU 231 stores acquired learning data in the RAM 234 or the storage 235. Then, the CPU 231 causes the GPU 239 to execute arithmetic processing for updating the learning model on the basis of the learning data or arithmetic processing for generating image data being an image conversion result on the basis of the received image data. As described above, the execution of a learning program by the CPU 231 advances a neural network learning for image conversion.

The RAM 234 operates as a temporary storage area such as a main memory or a work area of the CPU 231. The storage 235 is a readable and writable nonvolatile memory and records the learning program described above.

The input device 236 is an input device including a mouse, a keyboard, or the like. The display device 237 is identical to the display device 210 described with reference to FIG. 2A.

The data bus 233 is a communication unit configured to mutually send/receive image data and control information handled inside the learning apparatus 102 to/from processing units. The external interface 238 is configured to connect between the learning apparatus 102 and the network 104 such as LAN.

The GPU 239 is an image processor to perform neural network learning in cooperation with the CPU 231. In other words, the GPU 239 performs arithmetic processing for updating a learning model on the basis of learning data on the basis of information about control by the CPU 231.

FIG. 2C is a diagram illustrating a configuration of the image processing server. The image processing server 103 of FIG. 2C includes a CPU 261, a ROM 262, a RAM 264, a storage 265, an input device 266, a display device 267, and an external interface 268. The devices are configured to transmit/receive data to/from each other via a data bus 263.

The CPU 261 is a controller configured to entirely control the image processing server 103. The CPU 261 boots the OS by a boot program stored in the ROM 262 being a nonvolatile memory. The CPU 261 controls each of the devices via a bus such as the data bus 263. The CPU 261 executes arithmetic processing for generating image data being a result of image conversion, on the basis of received image data. Note that, as in the learning apparatus 102, processing relating to image processing may be partially performed by a GPU (not illustrated).

The RAM 264 operates as a temporary storage area such as a main memory or a work area of the CPU 261. The storage 265 is a readable and writable nonvolatile memory and records the image processing server program described above.

The input device 266 is identical to the input device 236 described with reference to FIG. 2B. The display device 267 is identical to the display device 210 described with reference to FIG. 2A.

The data bus 263 is a communication unit configured to mutually send/receive image data and control information handled inside the image processing server 103 to/from processing units. The external interface 268 connects between the image processing server 103 and the network 104 such as LAN.

<Learning Data>

The learning data input to the learning apparatus 102 by the engineer in S401 will be described. The learning data is data used by the learning apparatus 102 to learn the neural network in the learning unit 112. In order to learn the neural network, a pair of an input image and a ground truth image is required. In the present embodiment, an uncompressed image is used as the ground truth image, and an image having been lossy-compressed and having compression noise is used as an input image.

FIG. 3 is a diagram illustrating a structure of learning data. As illustrated in FIG. 3, the learning data 306 is data including a pair of a ground truth image and an input image. For the ground truth image 303, an image 301 obtained by rendering PDL data 300 (electronic document, original data) is used directly as an uncompressed image 302. For the input image 305, a compressed image 304 obtained by performing lossy compression on the image 301 obtained by rendering the PDL data 300 is used.

Here, lossy compression processing is performed by an apparatus under a development environment of the engineer. Note that the apparatus used for the lossy compression processing desirably has the same model as that of the image processing apparatus 101a.

In addition, in order to perform conversion to a high-quality image, it is necessary to learn the neural network by using a large amount of learning data, but, here, a description will be given on the assumption that the neural network has already been sufficiently learned.

<Learning Process>

Figure 6:
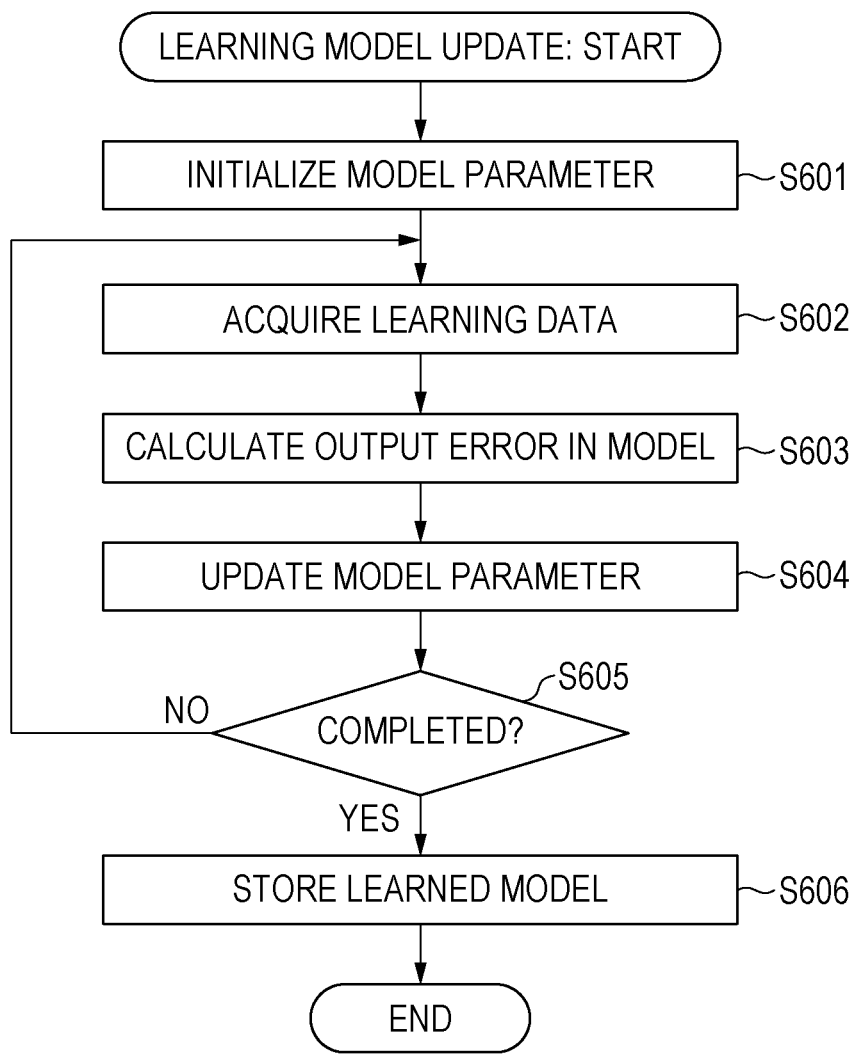
FIG. 6 is a flowchart illustrating learning model update.

FIG. 6 is a flowchart illustrating a process of learning a learning model by the learning apparatus 102 in S402 of FIG. 4A. Note that the steps illustrated in FIG. 6 are stored in the ROM 232, the RAM 234, the storage 235, or the like of the learning apparatus 102 and are executed by the CPU 231 and the GPU 239 of the learning apparatus 102.

As illustrated in FIG. 6, the CPU 231 uses the GPU 239 to initialize the values of weight parameters constituting the neural network used as the learning model (S601). In other words, for example, the CPU 231 sets the weight parameters constituting the neural network to random values or loads previously learned values for resetting. Next, the CPU 231 uses the GPU 239 to acquire, as learning data, a pair of an input image and a ground truth image, from the learning data input in S401 of FIG. 4A. In the input image and the ground truth image, resolution and gradation conditions are met (S602).

Furthermore, the CPU 231 uses the GPU 239 to input the learning data (the pair of the input image and the ground truth image) to the neural network prepared in S601 to perform computing for calculating an error in pixel value between the input image and the ground truth image (S603). Still furthermore, the CPU 231 uses the GPU 239 to execute computing of updating a value of a weight parameter of the learning model (S604). This processing is generally called backpropagation. Next, the CPU 231 uses the GPU 239 to determine whether the arithmetic processing has been completed a predetermined number of times of learning by using a predetermined number of pieces of learning data (S605). Here, if the predetermined number of times of learning using the predetermined number of pieces of learning data has been completed (YES in S605), the CPU 231 transitions to S606, and otherwise, the CPU 231 transitions to S602 to repeat computing in S602 to S604. Next, the CPU 231 uses the GPU 239 to store the value of a weight parameter constituting the neural network of the learned model in a storage unit such as the storage 235 (S606). The learned model acquired in S606 is formed as an image converting unit configured to convert a low-quality image including an unknown image into a high-quality image, instead of replacing a known low-quality image with a known high-quality image.

Figure 11:
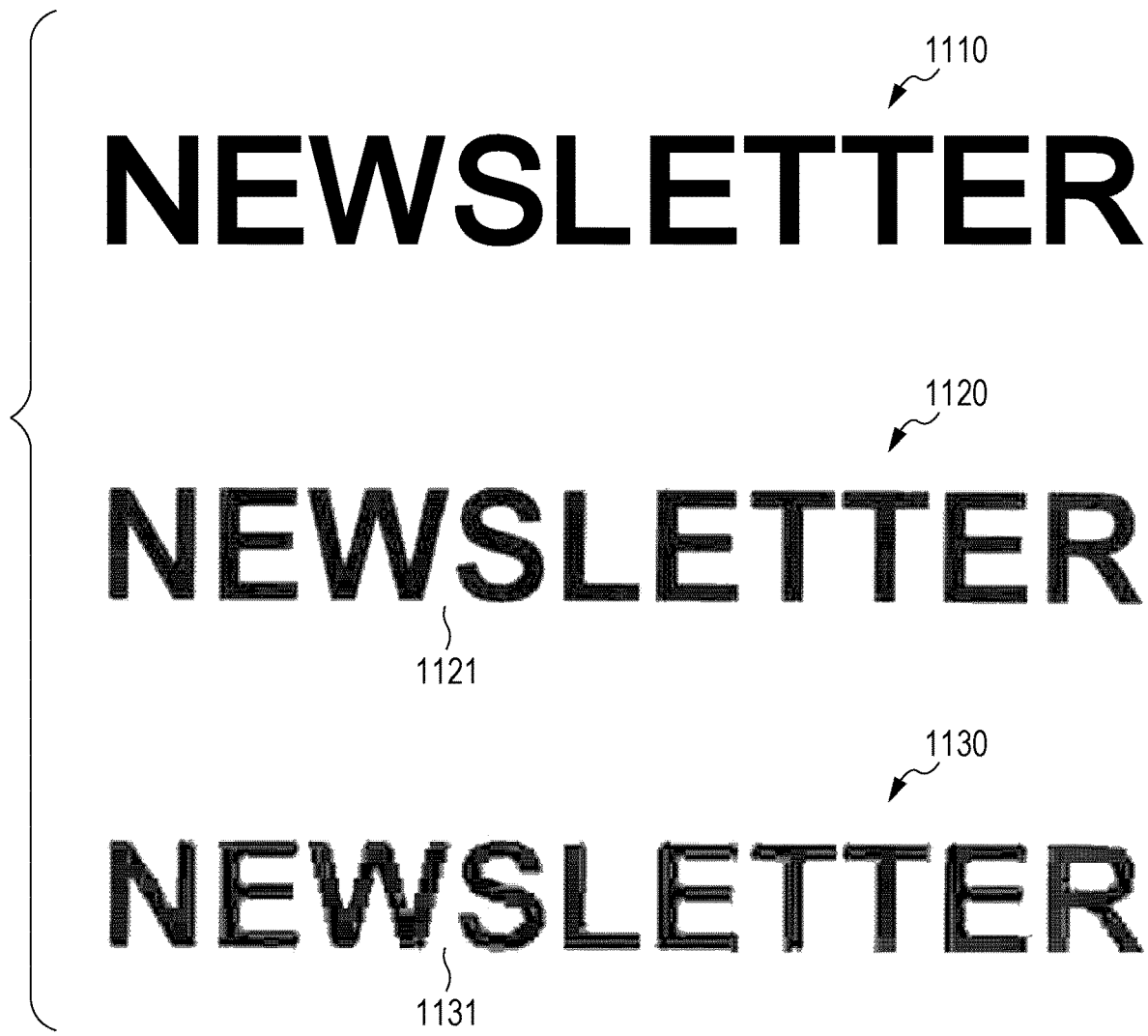
FIG. 11 is a diagram illustrating an example of an image.

In the present embodiment, the ground truth image and the input image as illustrated in FIG. 11 are used in repeated processing of S602 to S604. FIG. 11 is a diagram illustrating examples of the ground truth image and the input image.

An image 1110 is an uncompressed image having a character string "NEWSLETTER" drawn. The image 1110 is used as the ground truth image. An image 1120 is an image generated by performing JPEG compression (medium quality) on the image 1110.

The mage 1120 includes noise along a contour of a character as shown in an image portion 1121. This noise is called mosquito noise which is a disturbance in an image occurring at a contour portion or a portion having a large variation in color. The image 1120 is used as the input image.

An image 1130 is an image generated by performing JPEG compression (low quality) on the image 1110. In the image 1130, noise having a block-shaped contour occurs as shown in an image portion 1131. This noise is called block noise which is image disturbance caused in a partial area of an image and looking like a mosaic. The image 1130 is used as the input image.

When a learning model is updated by preparing a large number of pieces of learning data, such as pairs of the images 1110 and the images 1120, it is possible to obtain a characteristic for removing the mosquito noise. When a learning model is updated by preparing a large number of pieces of learning data, such as pairs of the images 1110 and the images 1130, it is possible to obtain a characteristic for removing the block noise.

In the present embodiment, a suitable amount of learning data such as pairs of the images 1110 and the images 1120 and a suitable amount of learning data such as pairs of the images 1110 and the images 1130 are prepared, and S602 to S604 are repeatedly performed. Thus, learning a difference/tendency between an input image and a ground truth image provides an image conversion characteristic for removing mosquito noise or block noise generated in an image due to lossy compression.

<Operation Screen>

Figure 8A:
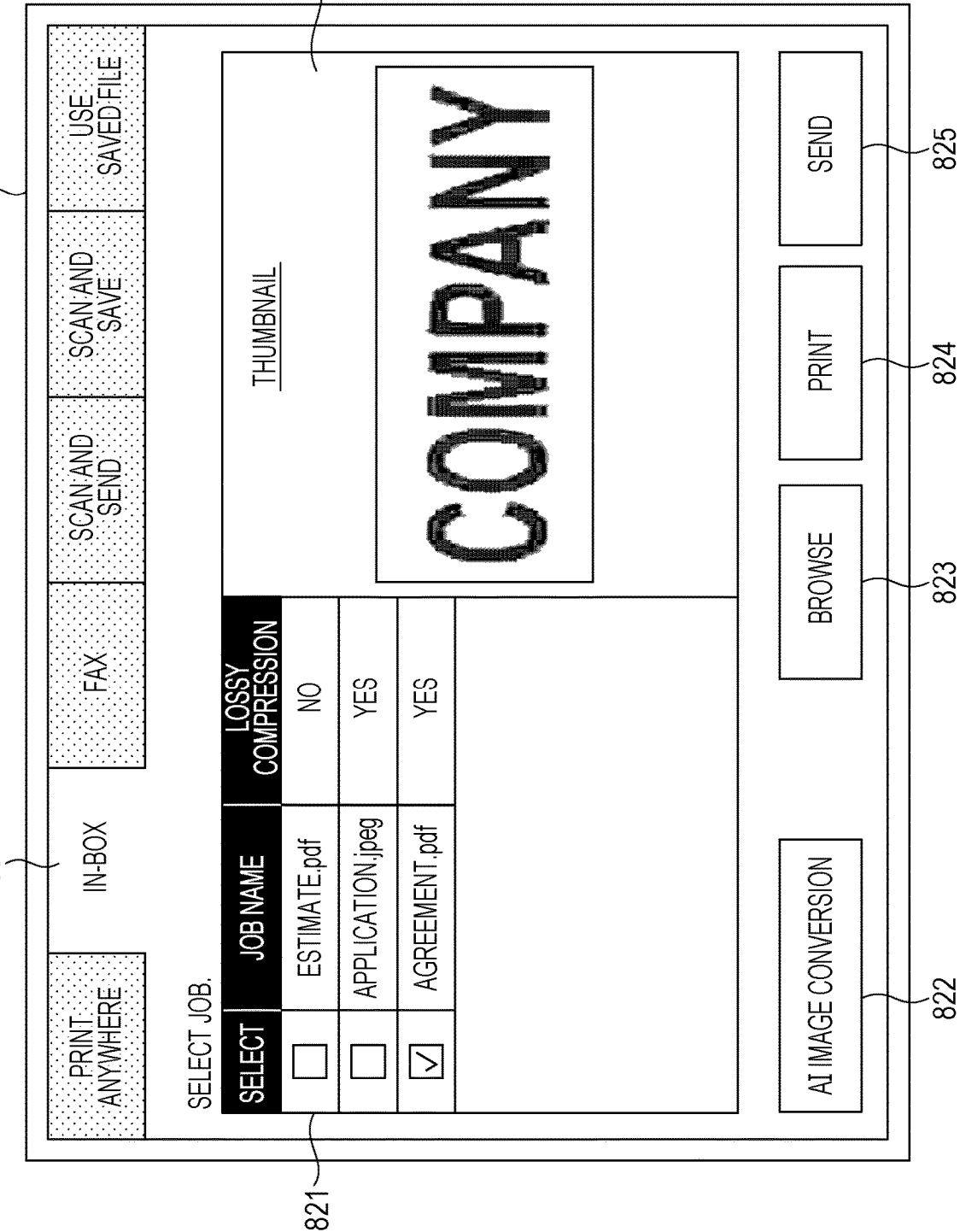
FIG. 8A is a view of a list window of received image data.
Figure 8B:
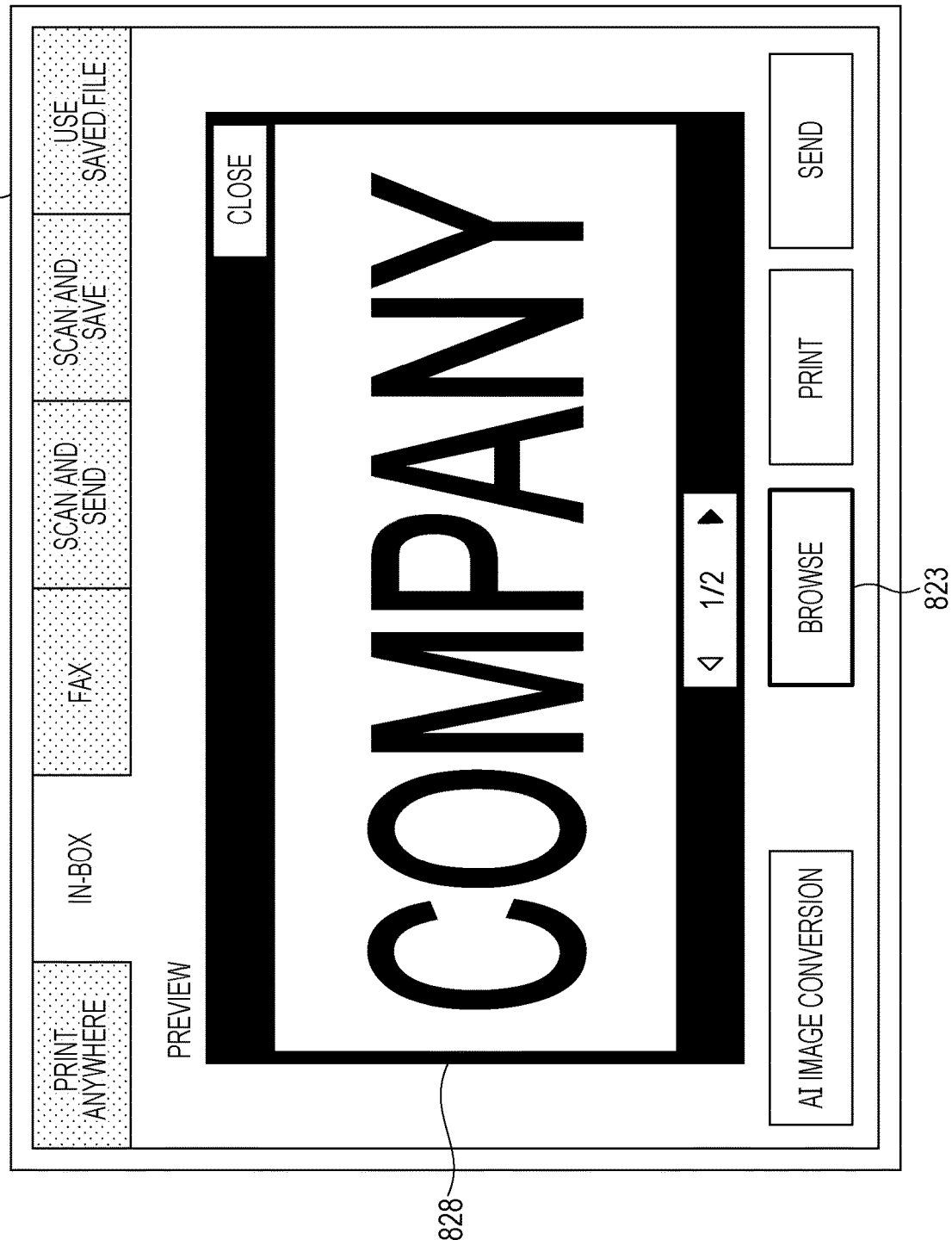
FIG. 8B is a view of a preview screen.
Figure 9:
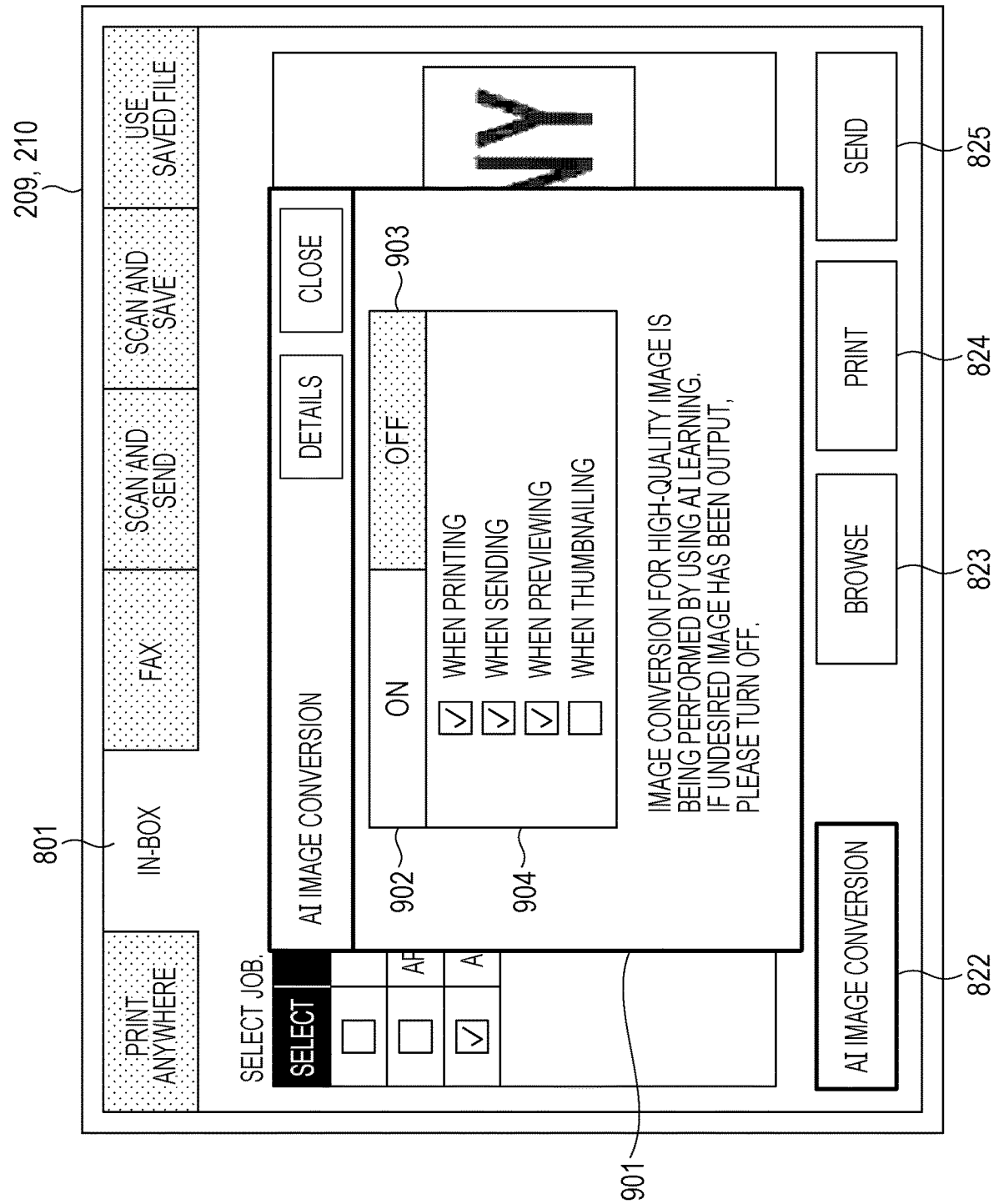
FIG. 9 is a view of a setting screen for AI image conversion.

In S406 illustrated in FIG. 4A, an operation screen configured to receive an output instruction given by the user is displayed on a screen using the input device 209 and the display device 210. FIGS. 8A, 8B, and 9 illustrate examples of the operation screen. FIG. 8A is a view of a list window of received image data. FIG. 8B is a view of a preview screen. FIG. 9 is a view of a setting screen for AI image conversion. FIG. 8A illustrates a screen showing a state in which an inbox function is selected from a menu of functions achievable by combining one or more functions such as printing, scanning, and faxing.

On the screen illustrated in FIG. 8A, an output instruction (printing, apparatus, browsing) for outputting image data sent to the image processing apparatus 101b as a destination can be executed.

As illustrated in FIG. 8A, on a job selection screen 801 of the inbox function, a job list 821, a browse button 823, a print button 824, and a send button 825 are arranged. From the job list 821, a job is selectable, and the browse button 823, print button 824, and send button 825 are configured to give an operation instruction for the selected job. In the job list 821, check boxes are arranged in association with job names, and one job can be specified from a plurality of jobs. When a job is selected, a thumbnail (quick preview) 827 of the selected job is displayed. Here, an image having unimproved quality is thumbnailed (previewed). Furthermore, in the present embodiment, it is also possible to check a status indicating whether a job includes an image which is lossy-compressed, in the job list 821. This status is updated with timing when the job is analyzed. Furthermore, an AI image conversion button 822 is arranged on the job selection screen 801. When the user's touch operation on the AI image conversion button 822 is detected on the selection screen 801, the setting screen 901 for AI image conversion is displayed as illustrated in FIG. 9.

On the setting screen 901, an ON button 902 permitting AI image conversion and an OFF button 903 not permitting AI image conversion are arranged. Furthermore, while the ON button 902 permitting AI image conversion is selected, advanced settings 904 for the AI image conversion are displayed, enabling specification of timing and an output method to which the AI image conversion is to be applied. Furthermore, on the setting screen 901, a note for AI image conversion is arranged as a message. When the setting screen 901 is closed using a close button, the setting screen returns to the job selection screen 801.

Examples of the advanced settings 904 include "when printing", "when sending", "when previewing", and "when thumbnailing". For example, when the browse button 823 is selected on the selection screen 801 while "when previewing" is set in the advanced settings 904, the advanced settings 904 change to the preview screen illustrated in FIG. 8B. The data of the job selected on the election screen 801 is sent to the image processing server 103, and data after conversion is returned from the image processing server. Then, a preview image 828 based on the data after conversion is displayed on the preview screen. Until the data after conversion is returned from the image processing server, preview display based on the data before image conversion may or may not be performed. In a case where "when previewing" is not set in the advanced settings 904, preview display is performed on the basis of data not subjected to image conversion stored in the storage 208 according to selection of the browse button 823. When display of a next page is instructed on the preview screen, a preview image of the next page is displayed. When the preview screen is closed using a close button, the preview screen returns to the job selection screen 801.

Furthermore, AI image conversion is also applied to other outputs.

For example, when the print button 824 is selected on the selection screen 801 while "when previewing" is set in the advanced settings 904, the advanced settings 904 change to a print setting screen (not illustrated). Then when the user specifies print setting and gives instruction to start of printing, the data of a job selected on the selection screen 801 is sent to the image processing server 103, and data after conversion is returned from the image processing server 103. Then, printing is performed on the basis of an image after conversion returned from the image processing server 103. In a case where "when printing" is not set in the advanced settings 904, the advanced settings 904 change to a print setting screen (not illustrated) according to the selection of the print button 824. Then, it is possible to perform printing on the basis of data not subjected to image conversion stored in the storage 208.

For example, when the send button 825 is selected on the selection screen 801 while "when sending" is set in the advanced settings 904, the advanced settings change to a transmission setting screen (not illustrated). When the transmission setting is specified by the user and start of sending is instructed, the data of a job selected on the selection screen 801 is sent to the image processing server 103, and data after conversion is returned from the image processing server 103. Then, sending is performed on the basis of an image after conversion returned from the image processing server 103. In a case where "when sending" is not set in the advanced settings 904, the advanced settings 904 change to a transmission setting screen (not illustrated) according to the selection of the send button 825. Then, it is possible to perform sending on the basis of data not subjected to image conversion stored in the storage 208. Note that in the transmission setting screen (not illustrated), a fax number, a network folder, a cloud service, and the like can be specified as a destination, in addition to e-mail address.

Here, the example in which received image data is output with the timing of output instruction has been described, but changing of apparatus setting enables output (printing/sending) of the image data with the timing of reception instead of the timing of output instruction. In other words, in a case where the apparatus setting is first setting, a received compressed file is stored in the internal storage 208. In a case where the apparatus setting is second setting, the compressed file is printed upon reception. In a case where the apparatus setting is third setting, the compressed file is sent to a destination (e-mail address, network storage, document management cloud service) specified in advance, upon reception. In this way, even in a case of automatic output, the content of setting set in advance in the advanced settings 904 may be applied.

<Image Output Process>

Figure 5:
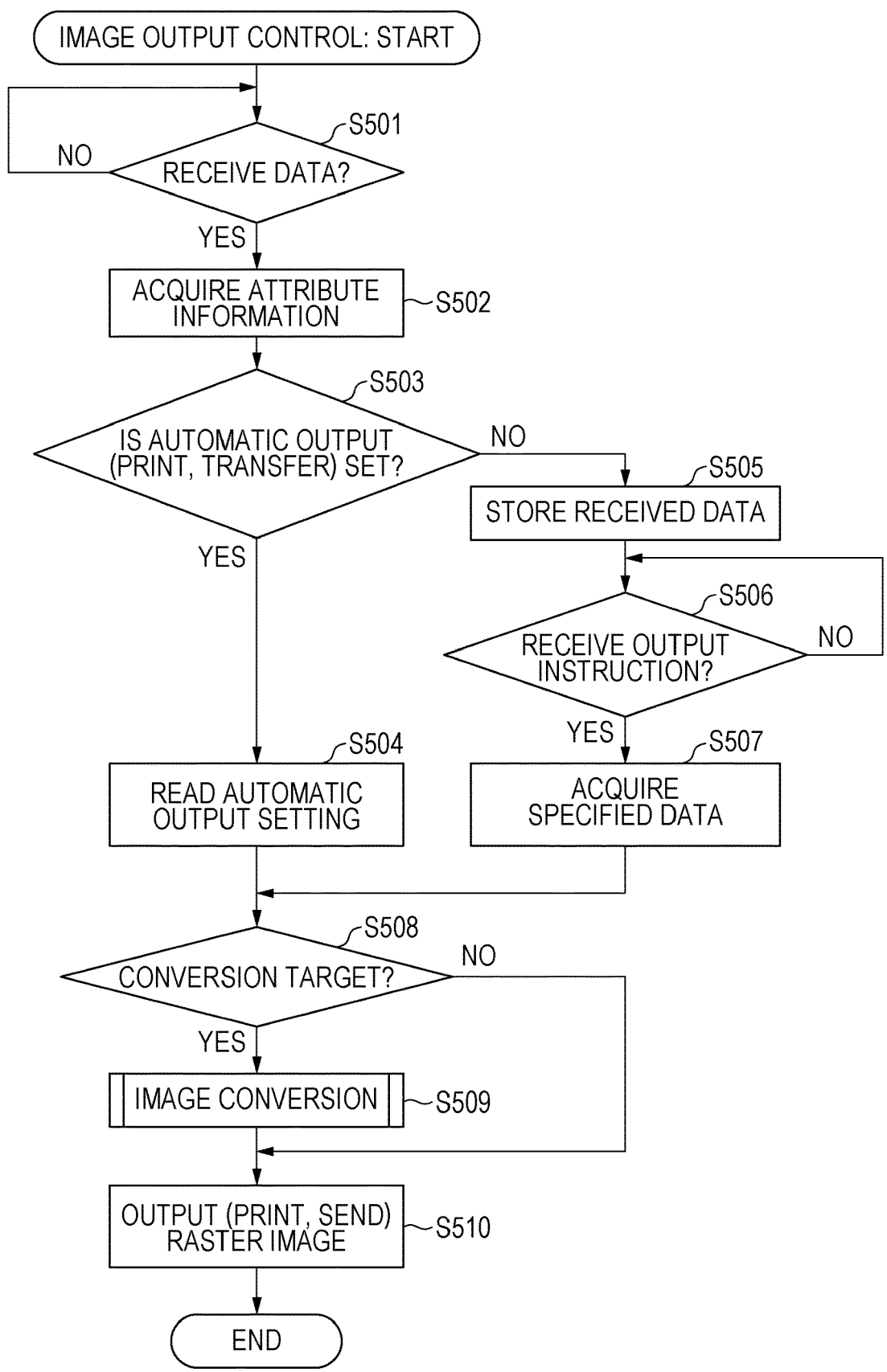
FIG. 5 is a flowchart illustrating image output control.

FIG. 5 is a flowchart illustrating a process of image output control by the image processing apparatus 101. Note that the steps illustrated in FIG. 5 are stored in the ROM 202, the RAM 204, the storage 208, or the like of the image processing apparatus 101 and are executed by the CPU 201 of the image processing apparatus 101. Part of the processing of the steps illustrated in the flowchart may be stored in the ROM 262, the RAM 264, the storage 265, or the like of the image processing server 103 and may be executed by the CPU 261 of the image processing server 103, on the basis of a request of the CPU 201.

As illustrated in FIG. 5, the CPU 201 determines whether a compressed file has been received by the external interface 211 via the network 104 (S501). Here, if the compressed file has been received (YES in S501), the CPU 201 proceeds to S502, and if not (NO in S501), the CPU 201 proceeds to S501 and waits for reception of a compressed file.

Next, the CPU 201 acquires attribute information of the compressed file received in S501 (S502). The attribute information includes, for example, job type information.

Next, the CPU 201 checks setting of a response made when receiving the compressed file (S503). If the response setting is automatic print setting or automatic transfer setting (YES in S503), the CPU 201 proceeds to S504. In S504, the CPU 201 acquires setting information about output made upon automatic transfer setting.

If the setting is not the automatic print setting or the automatic transfer setting but the reservation setting (NO in S503), the CPU 201 advances the process to S505. In S505, the CPU 201 stores the received compressed file in a storage area of the storage 208. Next, the CPU 201 determines whether an output instruction given by the user has been received via the input device 209 (S506). Here, the CPU 201 waits for reception of an output instruction (NO in S506), and if receiving the output instruction (YES in S506), the CPU 201 proceeds to S507. In S507, the CPU 201 acquires a specified compressed file according to the output instruction received in S506.

Next, the CPU 201 determines whether the specified compressed file is a target of AI image conversion (S508). This determination is made, for example, on the basis of setting of the advanced settings 904. If the specified compressed file is the target of AI image conversion (S508: YES), the CPU 201 performs control to execute image conversion for converting low-quality image data into high-quality image data (S509). If it is determined in S508 that the specified compressed file is not the target of AI image conversion (S508: NO), the CPU 201 skips S509 and executes printing, sending, or preview by using data not subjected to image conversion (S510). In the present embodiment, as shown in S407, image conversion is requested by sending a compressed file to the image processing server 103. The process of S509 will be described in detail separately with reference to the flowchart of FIG. 7. Finally, the CPU 201 executes printing, sending, or preview by using the image after conversion generated in S509 (S510).

<Attribute Information>

In the present embodiment, a difference in compression method per unit of an image of received data is determined, that is, it is determined whether an image is lossy-compressed. Therefore, it is possible to perform image conversion processing only on an image that is highly likely to be subjected to lossy compression, leading to excellent processing efficiency. The attribute information used for the determination described above is obtained from a command in a document, a header of an image, or the like.

Figure 10:
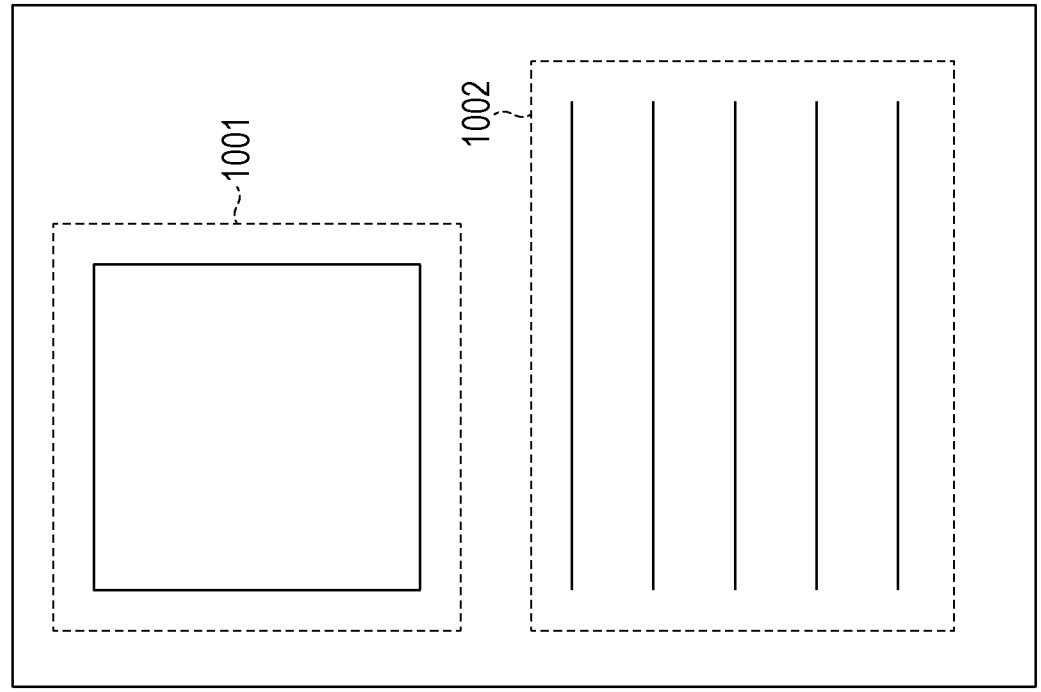
FIG. 10A is a diagram illustrating a configuration example of an input file.
FIG. 10B is a diagram illustrating an exemplary data structure.

FIG. 10A is a diagram illustrating a configuration example of an input file. FIG. 10B is a diagram illustrating an exemplary data structure. The image processing apparatus 101a has a SEND function to send a scanned image as a plurality of images (JPEG) or send a plurality of images collectively as one document (PDF). Furthermore, when a plurality of images is sent as one document, images included in the document can be compressed in various formats. For example, each of objects in a document is losslessly compressed (e.g., MMR compression) or lossy-compressed (e.g., JPEG compression). FIG. 10A illustrates a structure of a portable document format (PDF) file in which objects are compressed differently. In FIG. 10A, an object 1001 is lossy-compressed, and an object 1002 is losslessly compressed. FIG. 10B illustrates a data structure embedded in the structure of the PDF file of FIG. 10A. In FIG. 10B, in a header section 1011, version information of the PDF file is described. In a body section 1012, information about each object (the number of the object, the type of the object, the compression method of the object, and the like) indicating the contents of the PDF file is described. In a cross-reference table section 1013, a table indicating an offset position of each object (a byte position from an initial position of PDF data, nnnnnnnnnn in the figure) is described. In a trailer section 1014, information for reading a cross-reference table is described.

<Image Conversion Process>

Figure 7:
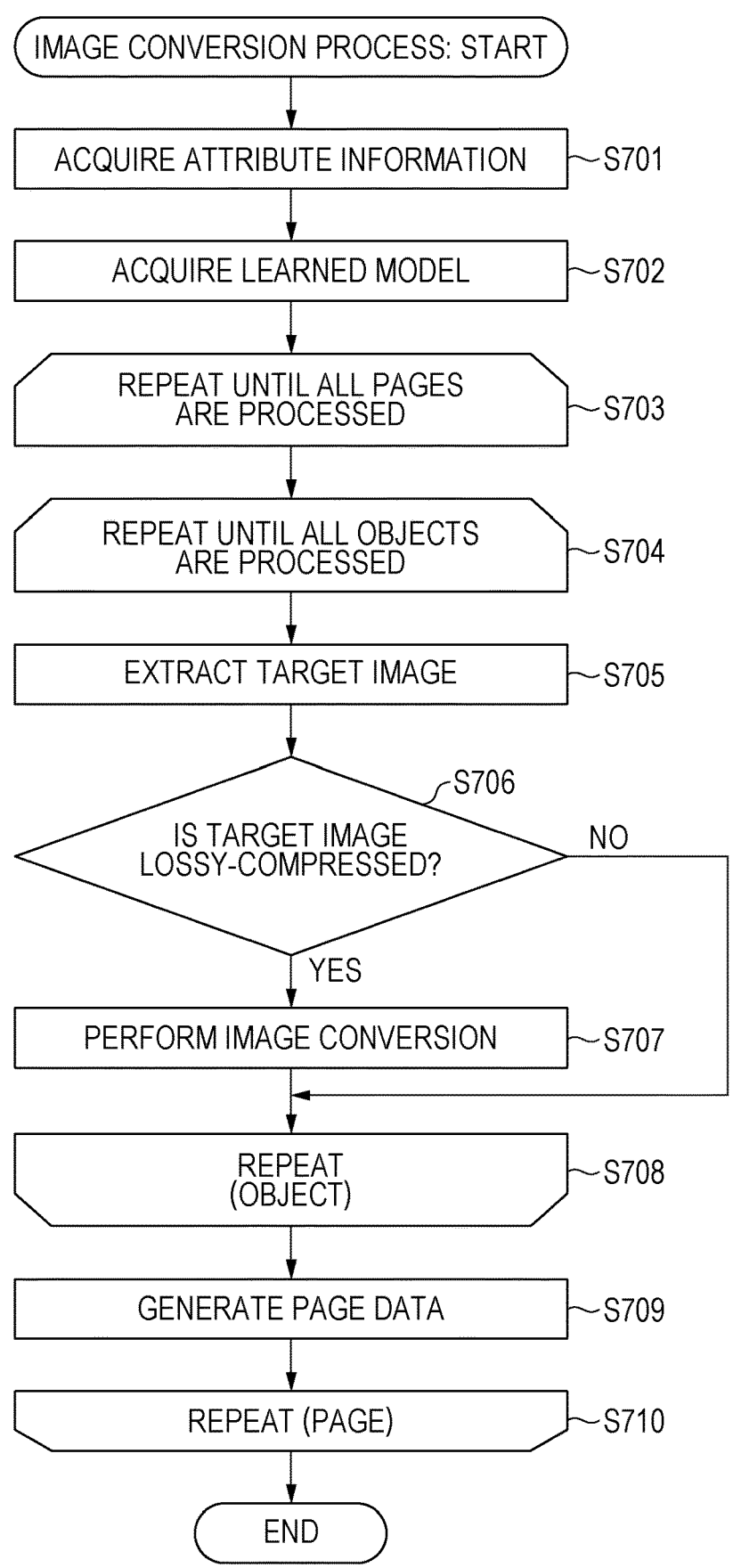
FIG. 7 is a flowchart illustrating an image conversion process.

FIG. 7 is a flowchart illustrating an image conversion process performed by the image processing server 103 in S408 of FIG. 4A and S509 of FIG. 5. Note that the steps illustrated in FIG. 7 are stored in the ROM 262, the RAM 264, the storage 265, or the like of the image processing server 103 and are executed by the CPU 261 of the image processing server 103.

As illustrated in FIG. 7, the CPU 261 acquires the compressed file received from the image processing apparatus 101b and attribute information of the data in the compressed file (S701). In the present embodiment, in a case where target data is document data such as PDF, conversion is performed on each object included in a page, and in a case where the target data is one or more pieces of image data such as JPEG, conversion is performed on each page. The CPU 261 reads a learning model stored in the storage 265 or the like (S702).

In S705, the CPU 261 acquires a minimum unit of image from the received data (S705). For example, in a case where target data is a PDF file, the CPU 261 refers to the cross-reference table section 1013 (description below xref in the data structure) to obtain position information of the object and extracts an area of the object to convert the area into raster image data. Next, the CPU 261 determines whether the obtained image is lossy-compressed on the basis of the attribute information and the like (S706). For example, the CPU 261 checks information embedded in the object in the body section 1012 and determines whether there is a description that the object type is an image and the image is lossy-compressed (e.g., obj<<Image/DCTDecode>>). If it is determined that the obtained image is lossy-compressed (S706: YES), the CPU 261 executes image conversion based on the learning model (S707). If it is determined that the obtained image is not lossy-compressed (S706: NO), the CPU 261 skips image conversion based on the learning model. If the target data is document data, the processing is repeated for all objects in the page (S704, S708). Then if the processing is completed for all objects in the page, the objects are combined to create one page image (S709). Specifically, the CPU 261 generates a composite image in which all objects including the image conversion result of each object are combined on the basis of the position information of each object. Note that if the target data is image data, a series of processing for image conversion is executed once for each page. By repeating such processing for one or more pages (S703, S710), generation of data after conversion is completed. The generated data after conversion is used in the processing of S510.

As described above, according to the first embodiment, it is possible to output a high-quality image after conversion by removing compression noise by using a neural network. When a lossy-compressed image is output, image conversion using a learned model can be achieved. Note that performance of the image conversion using the learned model is not limited to when an instruction is given for outputting an image. For example, the image processing apparatus 101b may request the image processing server to perform image conversion when receiving a file having been lossy-compressed by the SEND function. Furthermore, according to the first embodiment, by processing only an object having been lossy-compressed, that is, having compression noise, the waiting time required for image conversion is reduced, and further, a high-quality output image can be generated. Note that if merely outputting a high-quality image, detailed determination is not required. For example, the determination processing in S508 may be omitted. Furthermore, the determination processing in S706 may be omitted.

Second Embodiment

In the first embodiment, the example has been described in which image conversion is performed using one learning model. In the second embodiment, an example will be described in which image conversion is performed using a plurality of learning models (neural networks). Note that the image processing system 100 according to the second embodiment is identical to the image processing system 100 according to the first embodiment, except for the features described above.

<Plurality of Learning Models>

FIG. 12 is a table illustrating types of learning models. In the second embodiment, learning models A to N are used. These learning models are classified in consideration of information such as compression format (JPEG, WebP), compression quality (compression rate), and output source (output device, compression circuit, compression program). By preparing a plurality of learning models in this way, it becomes possible to perform image conversion suitable for a target image.

For example, the learning model E is a model that has learned mainly learning data having an image compressed to a medium quality (medium compression rate) as an input image. Therefore, mosquito noise (see the image portion 1121) which is a noticeable noise occurring when medium quality JPEG compression is applied can be efficiently removed. The learning model 1 is a model in that has learned mainly learning data having an image JPEG-compressed to a low quality (high compression rate) as an input image. Therefore, block noise (see the image portion 1131) which is a noticeable noise occurring when compressed to low quality can be efficiently removed.

Furthermore, a different compression format such as WebP has a different tendency of noise generation. Still furthermore, there may be cases where there is a difference in the definition of compression quality depending on the output source and where an image has been subjected to pre-processing or post-processing. Therefore, even if the learning models have the same high compression quality, the compression qualities are classified into the model A, model B, model C, model D, and the like as descried above.

Note that it is assumed that the plurality of models described above is used in an environment where quality information about a target image can be obtained. However, there is also a case where a target image has an unknown compression quality. In order to cope with such a case, it is preferable to prepare models used in cases where the compression quality is unknown, for example, a model M and a model N. The model M learns learning data that uses an input image having a medium compression quality and learning data that uses an input image having a low compression quality, at the same level. Therefore, noise caused by JPEG compression can be removed in a versatile manner.

<Image Conversion Process>

Figure 13:
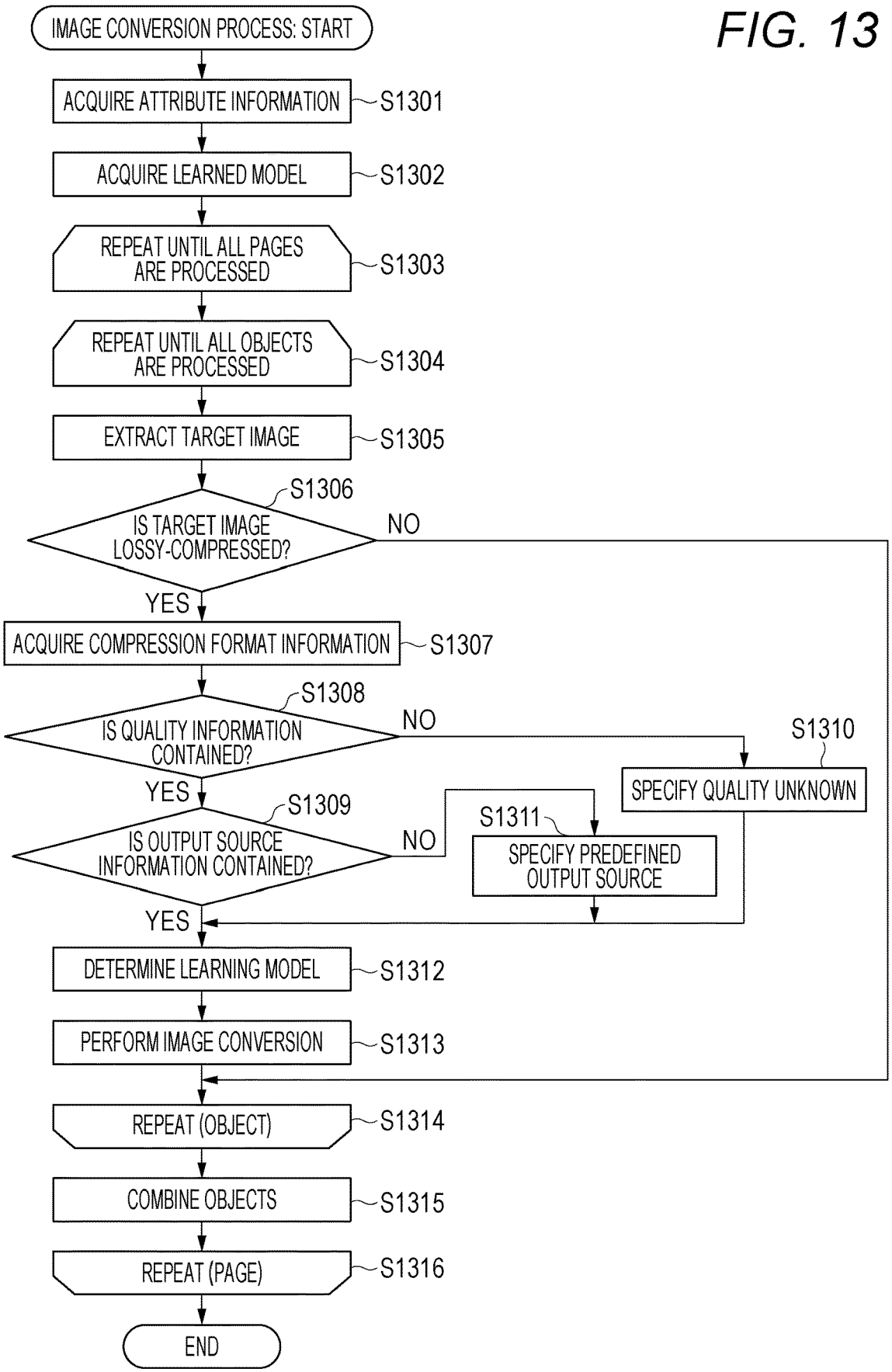
FIG. 13 is a flowchart illustrating an image conversion process according to one or more aspects of the present disclosure.

FIG. 13 is a flowchart illustrating an image conversion process according to a second embodiment. Note that the steps illustrated in FIG. 13 are stored in the ROM 262, the RAM 264, the storage 265, or the like of the image processing server 103 and are executed by the CPU 261 of the image processing server 103. Note that FIG. 13 includes portions common to those of FIG. 7 in the second embodiment of the present disclosure, and thus a description of the common portions is omitted, and only different portions will be described.

S1301 is identical to S701. The CPU 261 reads a learning model stored in the storage 265 or the like. In this embodiment, a plurality of learning models is read as illustrated in FIG. 12.

In S1305, the CPU 261 acquires a minimum unit of image from the received data (S1305). Next, the CPU 261 determines whether the obtained image is lossy-compressed on the basis of the attribute information and the like (S1306). Here, the determination is made by checking information embedded in the object in the body section 1012. For example, it is possible to determine whether the object is lossy-compressed, on the basis of a description that the object type is a lossy-compressed image (e.g., obj<<Image/DCTDecode>>) or extension information of the object. If the obtained image has not been lossy-compressed (S1306: NO), the CPU 261 proceeds to S1314. When it is determined that the obtained image has been lossy-compressed (S1306: YES), the CPU 261 subsequently obtains compression-related information of the target image (S1307). The compression-related information represents information about a compression format (compression format information), compression quality information, and output source information about a compressed image. Here, a description will be made on the assumption that the information about a compression format (extension information and the like) is acquired without fail. In S1308, the CPU 261 determines whether the acquired compression-related information includes compression quality information. If the compression quality information is not included (S1308: NO), the CPU 261 specifies unknown quality as a material for determining a learning model to be used (S1310). Then, the learning model M or the learning model N is determined as a model to be used, on the basis of the compression format/extension of the image (S1312).

If the compression quality information is included (S1308: YES), the CPU 261 determines the presence/absence of the output source information to select a more accurate learning model (S1309). If the output source information is included (S1309: YES), a learning model is determined on the basis of the output source information. In other words, any one of the learning models A to L is used. If the output source information is not included (S1309: NO), the CPU 261 specifies a predetermined output source as the material for determining a learning model to be used. The predetermined output source is, for example, an output source A or an output source C. Therefore, in S1312, one of the learning models A, C, E, G, I, and K is selected. Thereafter, image conversion based on the determined learning model is executed (S1313). S1303 to S1305 and S1314 to S1316 relating to repetition for each object and repetition for each page are identical to S703 to S705 and S708 to S710, and a description thereof will be omitted.

As described above, according to the second embodiment, the learning models are classified in consideration of information such as the compression format (JPEG, WebP), compression quality (compression rate), or output source (output device, compression circuit, compression program), and it is possible to perform more accurate image conversion. Note that the classification of the learning models does not necessarily need to consider all of the compression format (JPEG, WebP), compression quality (compression rate, compression mode), and output source (output device, compression circuit, compression program). In other words, the learning models may be classified on the basis of only part of the information. For example, the models may be classified only by the compression format (JPEG, WebP). In the present embodiment, a quality value of 100 to 71 is defined as high quality, a quality value of 70 to 41 is defined as medium quality, and a quality value of 40 to 1 is defined as low quality. However, relationships between numerical values and quality levels are not limited to the above description. The relationships between the numerical values and the quality levels may be changed as appropriate. Furthermore, the classifications of the quality levels are not limited to three levels but may be two levels or four or more levels.

Furthermore, as examples of the compression format, JPEG and WebP have been described, but other lossy-compression formats such as "JPEG 2000" and "JPEG XR" may be used. It is not always necessary to prepare a learning model for unknown quality.

Third Embodiment

In the first and second embodiments, a description has been made that the engineer prepares the learning data in advance and inputs the learning data to the learning apparatus. In contrast, in the third embodiment, a PDL job received during operation of the image processing apparatus is used to automatically generate learning data. The configuration of the image processing system 100 according to the third embodiment is identical to the image processing systems 100 according to the first and second embodiments, except for the above-described feature portions and portions relating thereto. Therefore, similar configurations are denoted by similar reference numerals, and a detailed description thereof will be omitted.

<Image Processing System 100>

Figure 14:
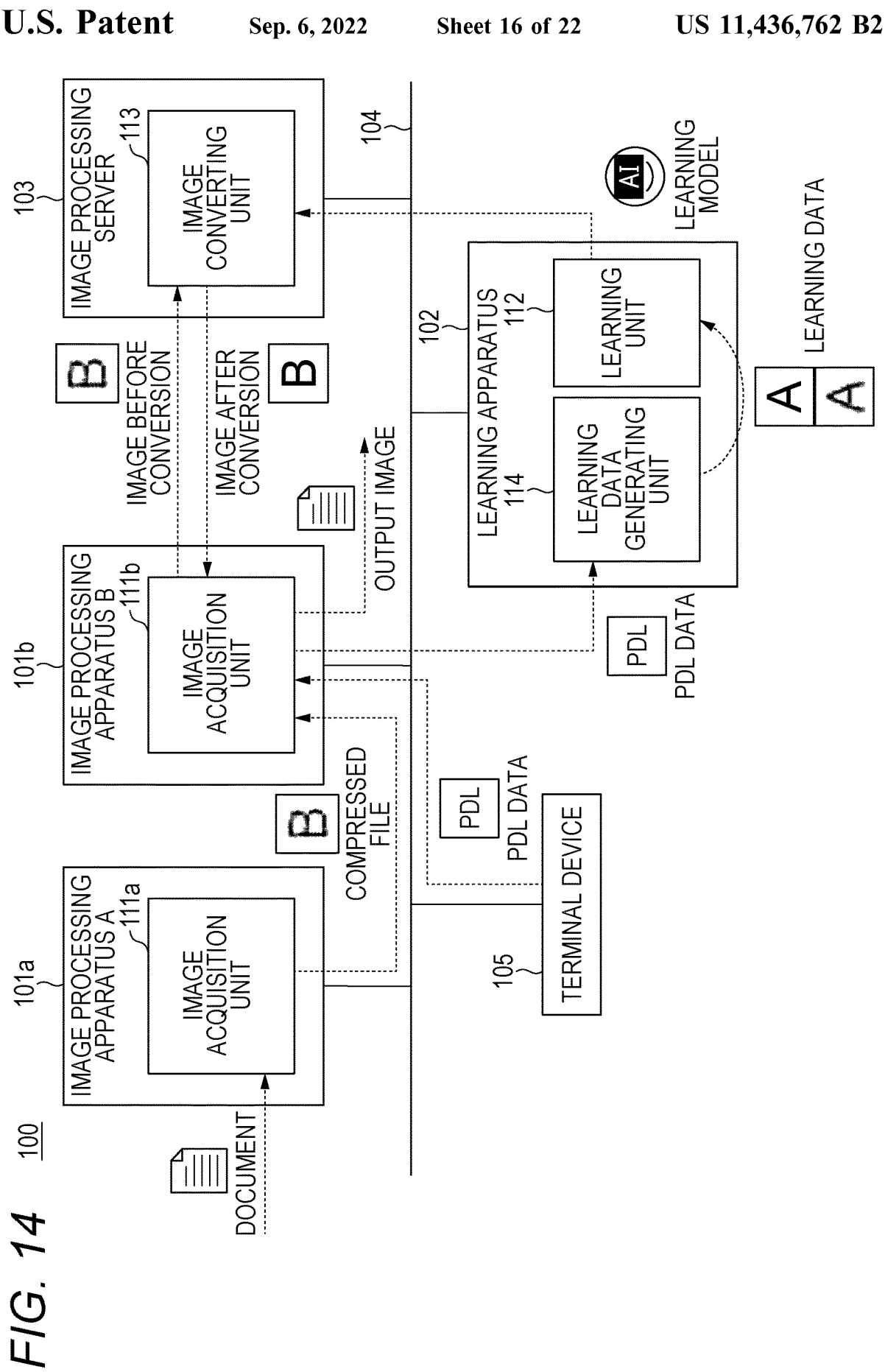
FIG. 14 is a diagram illustrating a configuration of an image processing system according to one or more aspects of the present disclosure.

FIG. 14 is a diagram illustrating a configuration of an image processing system 100 according to a third embodiment. As illustrated in FIG. 14, the image processing system 100 includes an image processing apparatus 101, a learning apparatus 102, an image processing server 103, and a terminal device 105 which are connected to each other via a network 104. The image processing apparatus 101, the learning apparatus 102, the image processing server 103, and the network 104 have configurations as described with reference to FIG. 1.

The terminal device 105 includes a personal computer, a tablet, or the like configured to send a print job to the image processing apparatus 101. When the user gives an instruction to perform printing via an operation unit (not illustrated), the terminal device 105 sends a print job (including PDL data) to the image processing apparatus 101. The image processing apparatus 101 performs a printing process according to the job from the terminal device 105 and sends the PDL data to the learning apparatus 102. The learning apparatus 102 generates a ground truth image and an input image from the PDL data (original data) and holds a pair of the generated images as learning data. It is assumed that the configuration of the terminal device 105 is substantially identical to the configuration of the image processing server 103, and a detailed description thereof will be omitted.

In the present embodiment, the learning apparatus 102 includes a learning data generation unit 114. The learning data generation unit 114 generates pseudo learning data having a pair of a ground truth image and an input image, by performing RIP (rendering) and lossy compression processing on the acquired PDL data. The learning data generation unit 114 stores the generated learning data in a storage 235. A CPU 231 loads a learning data generation program into a RAM 234 and executes the learning data generation program to achieve the learning data generation unit. A learning unit 112 learns a neural network using the learning data stored in the storage 235. The CPU 231 loads a learning program into the RAM 234 and executes the learning program to achieve the learning unit 112.

<Learning Sequence>

Figure 15A:
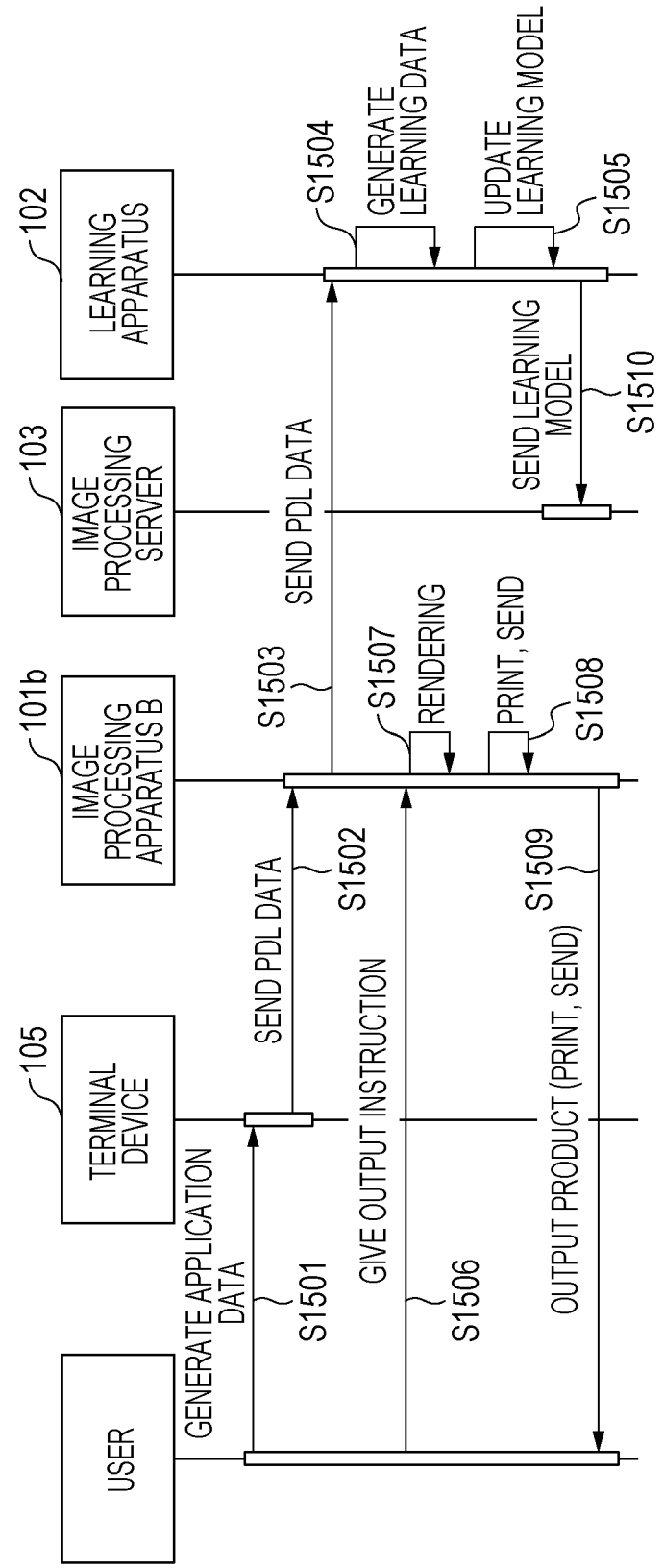
FIG. 15A is a diagram illustrating a learning sequence of the image processing system.

The learning sequence will be described with reference to FIG. 15A. FIG. 15A is a diagram illustrating a learning sequence of the image processing system 100 according to the third embodiment.

FIG. 15A is an operation example showing a case where both of generation of learning data and update of a learning model are performed by the learning apparatus 102. As illustrated in FIG. 15A, for example, the user creates application data (S1501) and sends PDL data generated by a printer driver or the like in the terminal device 105 to an image processing apparatus 101b, on the basis of the application data (S1502). The image processing apparatus 101b transfers the received PDL data to the learning apparatus 102 (S1503). In response to this, the learning apparatus 102 performs generation of learning data (S1504) and update of a learning model (S1505). The updated learning model is sent to the image processing server 103 (S1510). On the other hand, when the user gives an output instruction to the image processing apparatus 101b (S1506), the image processing apparatus 101b renders the received PDL data (S1507) and performs output processing such as printing or sending (S1508), as in a normal PDL printing process flow. Thereafter, the user obtains an output product (S1509).

<Automatic Learning Process>

Figure 16:
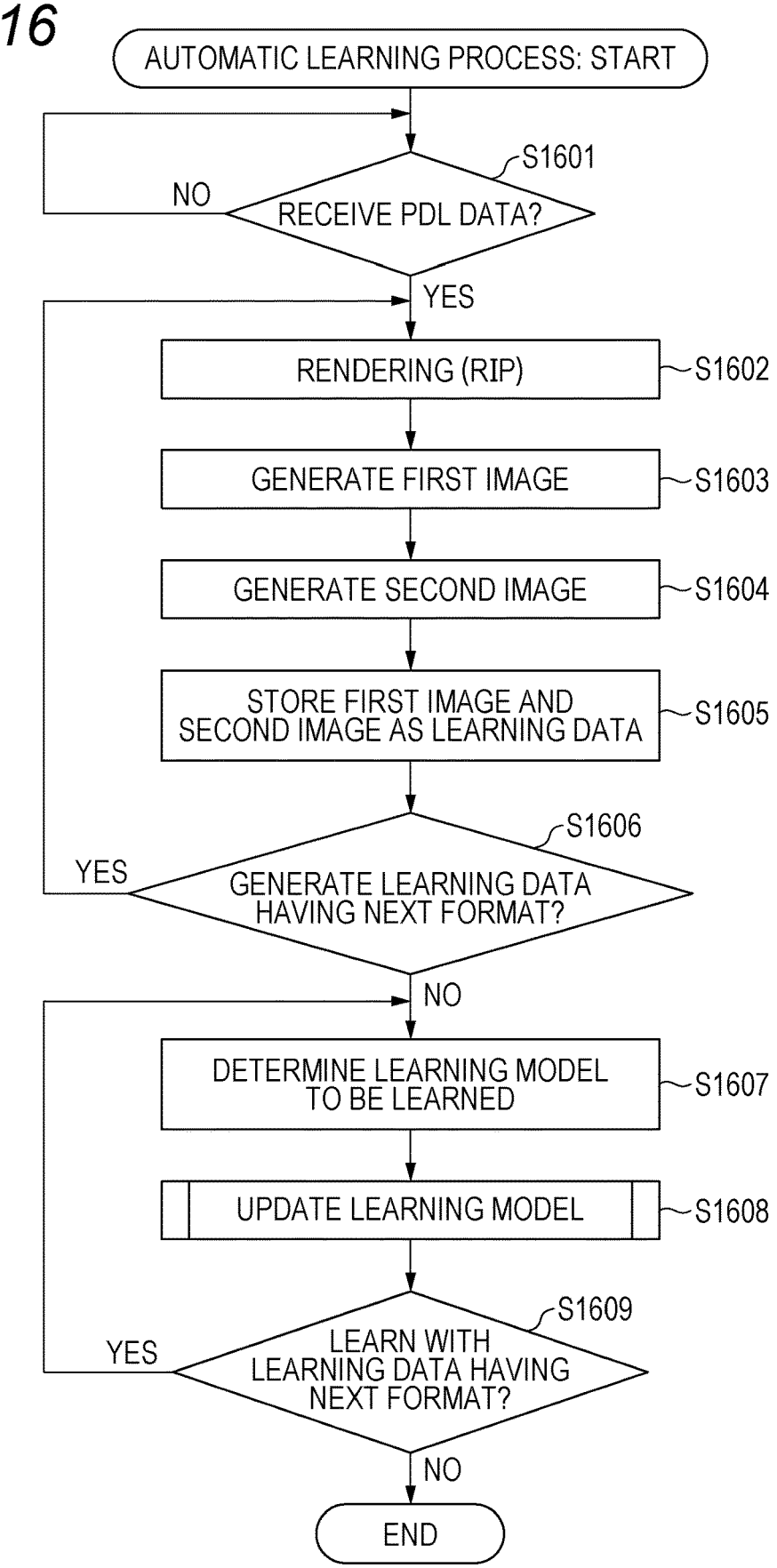
FIG. 16 is a flowchart illustrating an automatic learning process.

FIG. 16 is a flowchart illustrating an automatic learning process. Note that the steps illustrated in FIG. 16 are stored in a ROM 232, the RAM 234, the storage 235, or the like of the learning apparatus 102 and are executed by the CPU 231 and a GPU 239 of the learning apparatus 102.

As illustrated in FIG. 16, the CPU 231 determines whether vector image data such as PDL has been received by an external interface 238 via the network 104 (S1601). Here, if the PDL data has been received (YES in S1601), the CPU 231 proceeds to S1602, and if not (NO in S1601), the CPU 231 proceeds to S1601 and waits for reception of the PDL data. Next, the CPU 231 interprets the PDL data, converts the PDL data into a display list, and renders the display list to generate raster image data (S1602). Next, the CPU 231 generates a first image as a ground truth image on the basis of the raster image data generated in S1602 (S1603). Next, the CPU 231 generates a second image as an input image obtained by lossy-compressing the raster image data generated in S1602 (S1604). Note that parameters such as a format and quality of the lossy compression are adjusted by a learning model or the like using learning data. Here, the image data generated in S1603 and S1604 are generated as a plurality of pieces of image data each cut out to have a predetermined rectangular unit (e.g., 512×512 pixels), for example, in a reference region (positional coordinates in horizontal/vertical scanning) in a page including the same drawing object. Next, the CPU 231 stores, as the learning data, a pair of the input image and the ground truth image, with the first image as the ground truth image and the second image as the input image in a storage unit such as the storage 235 (S1605). Note that a plurality of pieces of learning data may be created according to the number of pages or the like of the PDL data. Next, the CPU 231 determines whether to generate learning data for another model (S1606). For example, after generating learning data for a learning model A, whether to generate learning data for a learning model E is determined. The learning data for the learning model A is different from the learning data for the learning model E, for example, in parameter of compression quality when an input image is lossy-compressed. Here, if the CPU 231 determines that the learning data for another learning model is to be continuously generated (YES in S1606), the process advances to S1602 and S1602 to S1605 are repeated. If the CPU 231 determines that the learning data for another learning model is not to be generated any more (NO in S1606), the process of generating the learning data is finished. Here, the first images as the ground truth images and the second images as the input images may be generated so as to cover all combinations of compression formats and compression qualities that can be output.

Next, the CPU 231 determines a learning model to be updated and learning data to be used for learning the learning model (S1607), and updates the learning model (S1608). Details of the processing of updating the learning model are as described with reference to FIG. 6. The CPU 231 determines whether there is a learning model to be updated, and if there is next learning data to be learned (S1609: YES), the process proceeds to S1607 to update a next learning model. If there is no next learning model to be learned (S1609: NO), the automatic learning process ends. Here, learning may be performed for all learning models which can be learned.

<Automatic Learning Setting>

As described above, in the present embodiment, a learning model is automatically learned on the basis of input PDL data. In other words, learning of the learning model proceeds so as to be optimized for the user's usage environment. Incidentally, the progress of the automatic learning is synonymous with the change in characteristics of the AI image conversion. In other words, it means that a result of AI image conversion which has been obtained in the past is different from a result thereof which will be obtained in the future. Therefore, it is desirable that the automatic learning could be stopped for a user who does not desire further automatic learning.

Figure 17A:
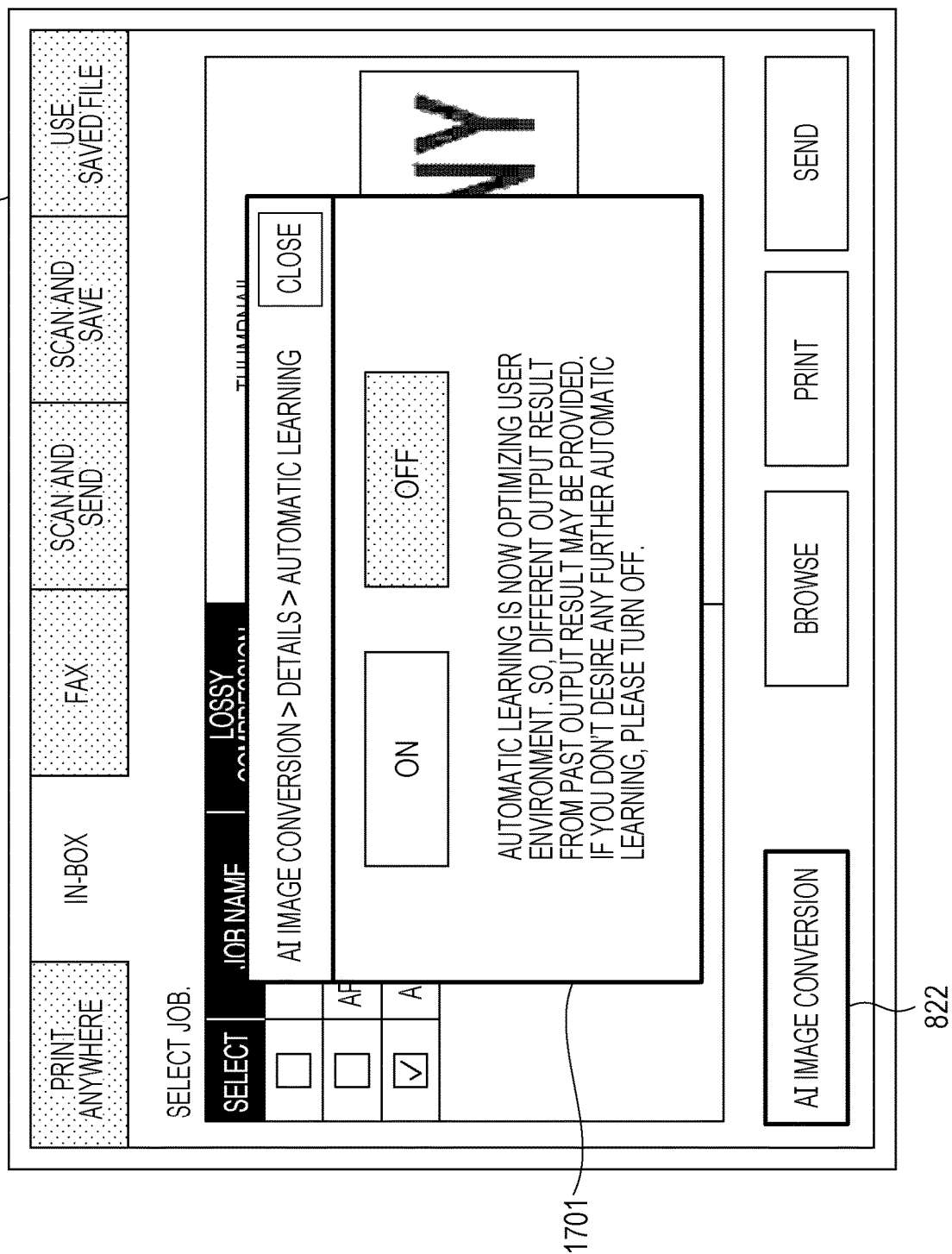
FIG. 17A is a view of a setting screen for automatic learning.

FIG. 17A is a view of a setting screen for automatic learning. As illustrated in FIG. 17A, in the present embodiment, a setting screen 1701 for automatic learning is configured to be displayed on a display device 210 of the image processing apparatus 101b. The setting screen 1701 is displayed by selecting a detail button on a screen 901 to display a details screen (not illustrated), and then specifying an item "automatic learning" on the details screen (not illustrated). The setting screen 1701 is configured to be displayed on the display device 210 of the image processing apparatus 101b.

On the setting screen 1701, either an ON button or an OFF button is configured to be selected. When the ON button is selected on the setting screen 1701, execution of automatic learning is permitted (automatic learning is accepted), and when the OFF button is selected, the automatic learning is disabled. Specifically, an example of a method of disabling automatic learning includes a method of stopping sending of learning PDL data to the learning apparatus 102 (S1503). Thus, no learning data is generated by the learning apparatus 102, and the learning model is not updated. Note that the method of disabling automatic learning may be achieved by another method. For example, when the updated learning model is sent (S1510), non-acceptance of the updated learning model may be employed. Alternatively, a request to stop the automatic learning may be sent to the learning apparatus 102 so that the learning apparatus 102 is caused not to update the learning model.

As described above, in the present embodiment, the learning model is automatically learned to be optimized for the user's usage environment. Thus, AI image conversion is performed with higher accuracy, and it is possible to provide an image desired by the user. Furthermore, in the present embodiment, PDL data is used for learning of a learning model while performing printing on the basis of the PDL data sent in normal use such as printing. Therefore, the user does not need to consciously input the learning data.

Other Embodiments

The present disclosure is not limited to the embodiments described above, various modifications and alterations (including organic combinations of the respective examples) can be made on the basis of the spirit and scope of the present disclosure, and the modifications and alterations are not excluded from the spirit and scope of the present disclosure. In other words, all configurations obtained by combining the above-described embodiments and modifications thereof should be construed as being included in the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

For example, in the second embodiment, the learning data generation unit 114 and the learning unit 112 are achieved in the learning apparatus 102 but each of the learning data generation unit 114 and the learning unit 112 may be achieved in separate apparatuses. In this configuration, an apparatus achieving the learning data generation unit 114 sends learning data generated by the learning data generation unit 114 to an apparatus achieving the learning unit 112. Then, the learning unit 112 learns a neural network on the basis of the received learning data. Furthermore, the function of the learning unit 112 may be achieved by the image processing server 103 or the image processing apparatus 101b. In other words, the learning apparatus 102 may be integrated with the image processing server 103 or the image processing apparatus 101b. Furthermore, the function as the image converting unit 113 may be achieved by the image processing apparatus 101b. In other words, the image processing server 103 and the image processing apparatus 101b may be integrated with each other. Furthermore, the function of the learning data generation unit 114 may be achieved by any of the terminal device 105, the image processing apparatus 101b, and the image processing server 103.

An example of generation of learning data by the image processing apparatus 101b is illustrated in FIG. 15B. FIG. 15B is a diagram illustrating a learning sequence in an image processing system 100 according to a modification. In the sequence of FIG. 15B, the user creates application data (S1501) and transfers PDL data generated by a printer driver or the like in the terminal device 105 to an image processing apparatus 101, on the basis of the application data (S1502). Thereafter, the PDL data is rendered by the image processing apparatus 101, and learning data is also generated in parallel with a normal PDL print job (S1511). Furthermore, the image processing apparatus 101 sends the learning data to the learning apparatus 102 in parallel with the normal PDL print job (S1512). The learning apparatus 102 receives the learning data sent from the image processing apparatus 101 and updates a learning model (S1505). The updated learning model is sent to the image processing server 103 (S1510). When the user gives an output instruction to the image processing apparatus 101 (S1506), the image processing apparatus 101 renders the received PDL data (S1507) and performs output processing of printing or sending (S1508), as in a normal PDL printing process flow. Thereafter, the user obtains an output product (S1509).

Figure 15C:
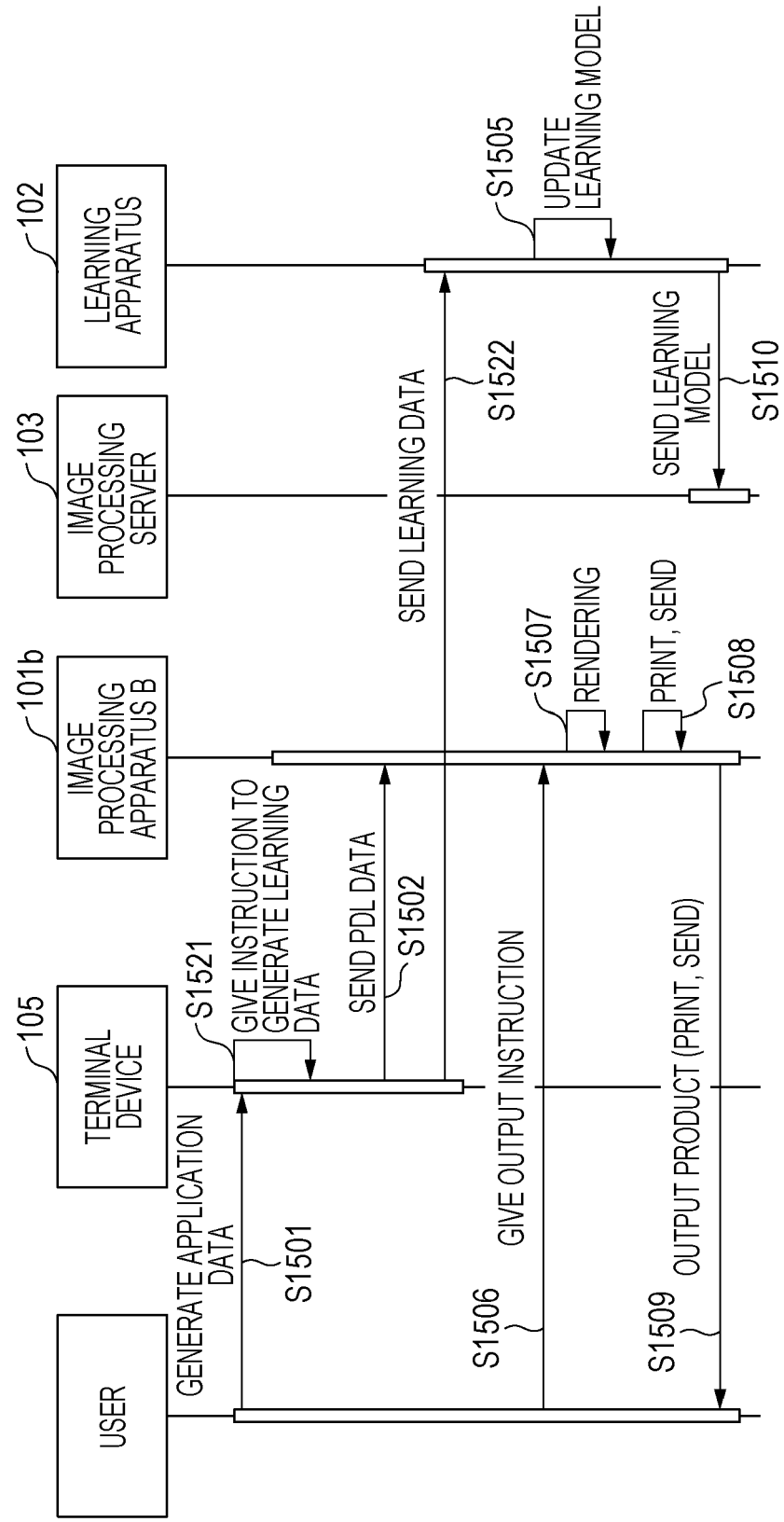
FIG. 15C is a diagram illustrating a learning sequence in a modification of the image processing system.

An example of generation of learning data by the terminal device 105 is illustrated in FIG. 15C. FIG. 15C is a diagram illustrating a learning sequence in an image processing system 100 according to a modification. In the sequence illustrated in FIG. 15C, application data is created by the user, and PDL data in the terminal device 105 is created on the basis of the application data. Then, the PDL data is rendered by an image processing simulator operable on the terminal device 105 to generate learning data (S1521). The generated learning data is sent from the terminal device 105 to the learning apparatus 102 (S1522), and the learning apparatus 102 updates a learning model by using the learning data (S1505). The updated learning model is sent to the image processing server 103 (S1510). The image processing apparatus 101b renders the received PDL data (S1507) and performs output processing of printing or sending (S1508), as in a normal PDL printing process flow. Thereafter, the user obtains an output product (S1509). Note that apparatuses that perform generation of learning data and update of learning model preferably include a computational resource (e.g., graphics processing unit (GPU), field-programmable gate array (FPGA)) configured to perform predetermined arithmetic processing.

Figure 4B:
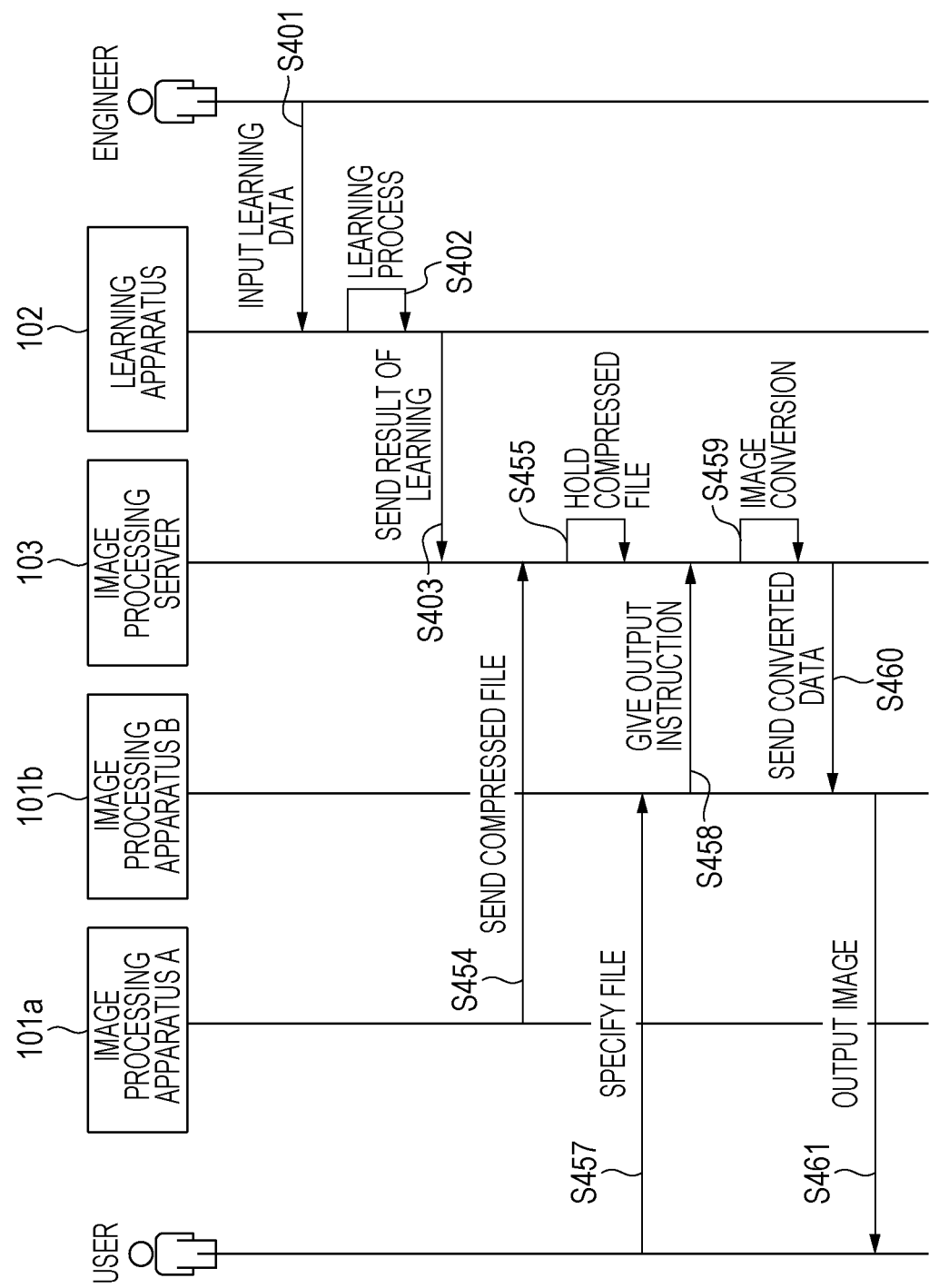
FIG. 4B is a diagram illustrating a use sequence in a modification of the image processing system.

Furthermore, in the first embodiment, as illustrated in FIG. 4A, an aspect in which the image processing apparatus 101a sends data to the image processing apparatus 101b and the image processing apparatus 101b transfers data to the image processing server has been described. However, as illustrated in FIG. 4B, the image processing apparatus 101a may directly send data to the image processing server. FIG. 4B is a diagram illustrating a use sequence in a modification of the image processing system. In this use sequence, the steps of S401 to S403 are identical to the steps of S401 to S403 in FIG. 4A. Then, the image processing apparatus 101a sends a compressed file to the image processing server 103 (S454). Upon receiving the compressed file, the image processing server 103 holds the received compressed file (S455). Then, in order to output an image on the basis of the compressed file stored in the image processing server 103, the user performs a file specification operation on the image processing apparatus 101b and gives a file specification instruction to the image processing apparatus 101b (S457). The image processing apparatus 101b requests the file from the image processing server 103, according to the user's instruction (S458). The image processing server 103 performs image conversion of inputting a low-quality image before conversion held in S455 and outputting a high-quality image after conversion (S459). The image processing server 103 sends the high-quality image after conversion generated in S459 to the image processing apparatus 101b (S460). The image processing apparatus 101b uses the high-quality image after conversion received in S460 to output an image in an output form (such as printing) for which an instruction is given (S461). Note that examples of outputting the image include, in addition to printing, sending of the image to a sending destination desired by the user, storage of the image in a storage (network storage), or display (preview) of the image on a screen.

Figure 17B:
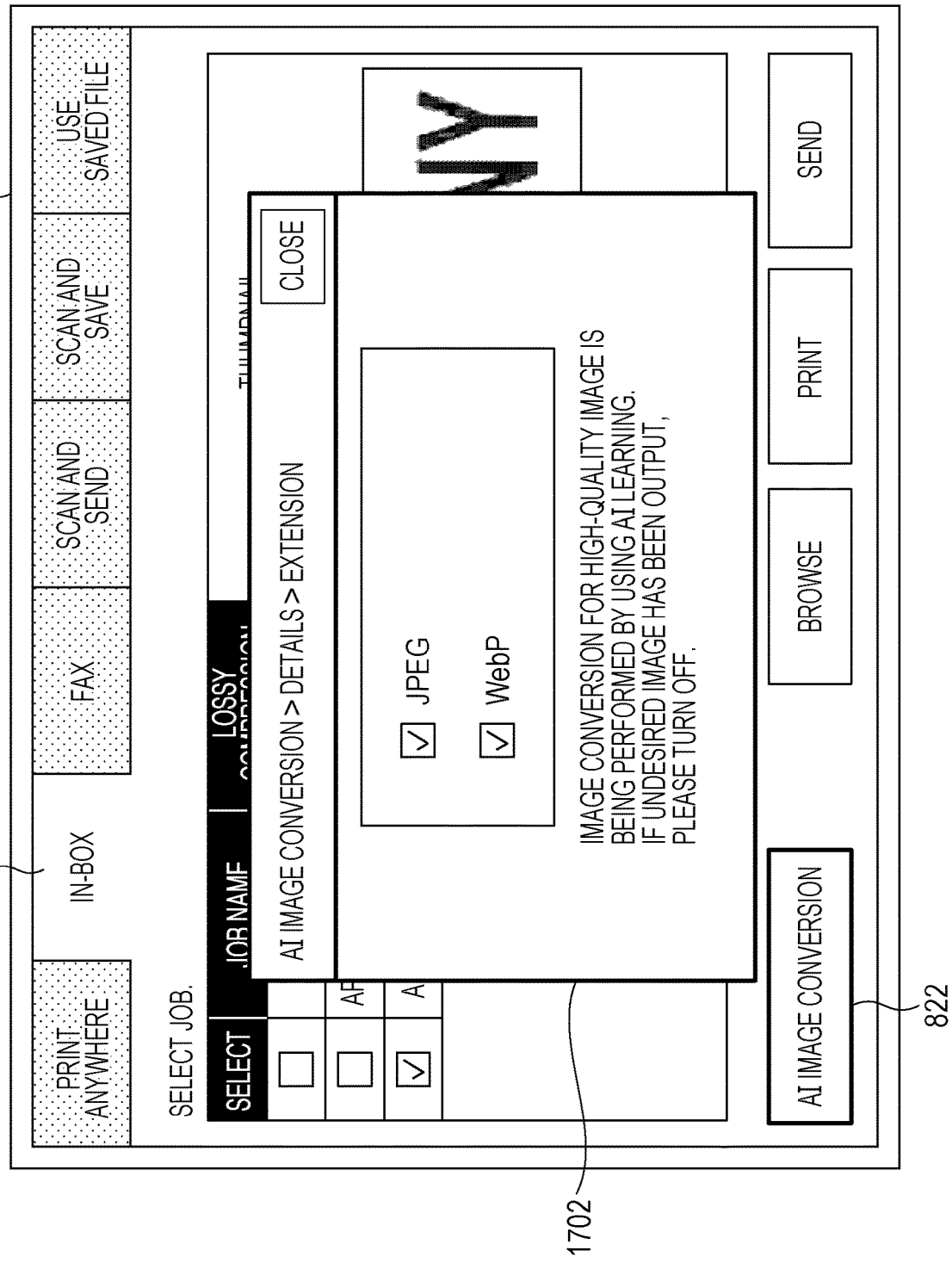
FIG. 17B is a view of a setting screen for a target extension.

Furthermore, in the second embodiment, setting of on/off of AI image conversion is made possible for each use application (screen 901), but on/off of AI image conversion may be set on the basis of another condition. For example, the on/off of AI image conversion may be set according to image compression format. FIG. 17B is a view of a setting screen for a target extension. The setting screen 1702 is configured to be displayed by selecting a detail button on the screen 901 to display a details screen (not illustrated), and then specifying an "extension" on the details screen (not illustrated). When the user checks the JPEG check box on the setting screen 1702, a JPEG image is subjected to AI image conversion, and when the user unchecks the JPEG check box, the JPEG image is not subjected to AI image conversion. Similarly, when the WebP check box is checked, a WebP image is subjected to AI image conversion, and when the WebP check box is unchecked, the WebP image is not subjected to AI image conversion.

The screens illustrated in FIGS. 17A, 17B, 8A, 8B, and 9 may be configured to be displayed on another device. For example, the above-described screens may be caused to be displayed on a display device included in any one of the terminal device 105, the image processing server 103, and the learning apparatus 102. Then, an operation according to a screen to be displayed may be received. Screen information or operation contents may be transferred to the image processing apparatus 101b, for example, via the network 104.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-060441, filed Mar. 27, 2019, which is hereby incorporated by reference herein in its entirety.

What is claimed is:

1. An image processing system comprising:
 at least one memory that stores a program; and
 at least one processor that executes the program to perform:
 generating first image data based on received PDL data;
 generating second image data by lossy-compressing the first image data; and
 causing a first neural network to perform learning based on the generated first image data and the generated second image data,
 wherein the first neural network can be used for obtaining image data after conversion by converting compressed image data.

2. The image processing system according to claim 1, wherein a neural network used for converting the compressed image data is selected from a plurality of neural networks which include the first neural network, based on at least compression format information about the compressed image data.

3. The image processing system according to claim 1, wherein
 the at least one processor further performs:
 generating third image data by lossy-compressing the first image data, wherein the second image data and the third image data have different compression rates; and
 causing a second neural network to perform learning based on the first image data and the third image data, wherein the plurality of neural networks includes the first neural network and the second neural network, and
 wherein the neural network used for converting the compressed image data is selected from a plurality of neural networks which include the first neural network and the second neural network, based on at least compression format information about the compressed image data.

4. The image processing system according to claim 1, wherein a neural network used for converting the compressed image data is selected from a plurality of neural networks which include the first neural network, based on at least quality information about the compressed image data.

5. The image processing system according to claim 1, wherein
 wherein a neural network used for converting the compressed image data is selected from a plurality of neural networks which include the first neural network, based on at least output source information about the compressed image data.

6. The image processing system according to claim 1, wherein
 the at least one processor further performs:
 causing a display to display a screen that makes it possible to specify whether to permit the first neural network to perform automatic learning based on the generated first image data and the generated second image data.

7. The image processing system according to claim 3, wherein
 the compression format information is specified via a screen that makes it possible to specify the format of the compressed image data.

8. The image processing system according to claim 1, wherein
 the at least one processor further performs:
 causing a display to display a screen on which a function using the image data after conversion is to be specified in advance.

9. The image processing system according to claim 1, wherein the image data after the conversion is used for outputting a print.

10. The image processing system according to claim 1, wherein the image data after the conversion is send to an external device.

11. The image processing system according to claim 1, wherein the image data after the conversion is displayed at a screen.

12. The image processing system according to claim 1, wherein the first image data does not include block noise, and the second image data includes block noise.

13. The image processing system according to claim 1, wherein the first image data does not include mosquito noise, and the second image data includes mosquito noise.

14. The image processing system according to claim 1, wherein the second image data is image data of JPEG format.

15. The image processing system according to claim 1, wherein the second image data is image data of WebP format.

16. An image processing method comprising:
 generating first image data based on received PDL data;
 generating second image data by lossy-compressing the first image data; and
 causing a first neural network to perform learning based on the generated first image data and the generated second image data,
 wherein the first neural network can be used for obtaining image data after conversion by converting compressed image data.

17. A non-transitory computer readable storage medium storing a program for causing a processor to perform an image processing method, the method comprising:
 generating first image data based on received PDL data;
 generating second image data by lossy-compressing the first image data; and
 causing a first neural network to perform learning based on the generated first image data and the generated second image data,
 wherein the first neural network can be used for obtaining image data after conversion by converting compressed image data.

* * * * *